(12) United States Patent
Foegelle

(10) Patent No.: US 10,382,148 B2
(45) Date of Patent: Aug. 13, 2019

(54) SYSTEM AND METHOD FOR CALIBRATION, MONITORING AND CONTROL OF AN ANECHOIC BOUNDARY ARRAY RF ENVIRONMENT SIMULATOR

(71) Applicant: ETS—Lindgren Inc., Cedar Park, TX (US)

(72) Inventor: Michael David Foegelle, Cedar Park, TX (US)

(73) Assignee: ETS-Lindgren, Inc., Cedar Park, TX (US)

( * ) Notice: Subject to any disclaimer, the term of this patent is extended or adjusted under 35 U.S.C. 154(b) by 0 days.

(21) Appl. No.: 15/967,051

(22) Filed: Apr. 30, 2018

(65) Prior Publication Data

US 2018/0254840 A1    Sep. 6, 2018

Related U.S. Application Data

(63) Continuation-in-part of application No. 14/962,299, filed on Dec. 8, 2015, now Pat. No. 9,979,496, and a continuation-in-part of application No. 15/950,256, filed on Apr. 11, 2018.

(60) Provisional application No. 62/492,637, filed on May 1, 2017, provisional application No. 62/163,674, filed on May 19, 2015.

(51) Int. Cl.
*H04B 17/13*     (2015.01)
*H04W 24/06*    (2009.01)
*H04W 52/52*    (2009.01)
*H04B 17/391*   (2015.01)

(52) U.S. Cl.
CPC ........ *H04B 17/13* (2015.01); *H04B 17/3912* (2015.01); *H04W 24/06* (2013.01); *H04W 52/52* (2013.01)

(58) Field of Classification Search
CPC ...... H04B 17/21; H04B 17/13; H04B 17/102; H04B 17/3912; H04B 17/11; H04B 1/0475
See application file for complete search history.

(56) References Cited

U.S. PATENT DOCUMENTS

| | | | |
|---|---|---|---|
| 2008/0056340 A1* | 3/2008 | Foegelle | H04B 17/0082 375/224 |
| 2011/0084887 A1* | 4/2011 | Mow | G01R 29/10 343/703 |
| 2012/0100813 A1* | 4/2012 | Mow | H04B 17/12 455/67.12 |

* cited by examiner

*Primary Examiner* — Sung S Ahn
(74) *Attorney, Agent, or Firm* — Christoper & Weisberg, P.A.

(57) ABSTRACT

Some embodiments include a system for simulating electromagnetic environments that includes a channel emulator having a plurality of outputs, each output associated with a different operational path. Each operational path has a power amplifier, an antenna and a first coupling mechanism. The power amplifier is coupled to an output of the channel emulator. The antenna is in communication with a test region of the apparatus. The first coupling mechanism simultaneously couples power to the antenna and to a first measurement path when the operational path is coupled to the test region, so that a calibration state of the operational path can be determined and adjusted without interruption of a signal coupled to the antenna in the operational path.

20 Claims, 19 Drawing Sheets

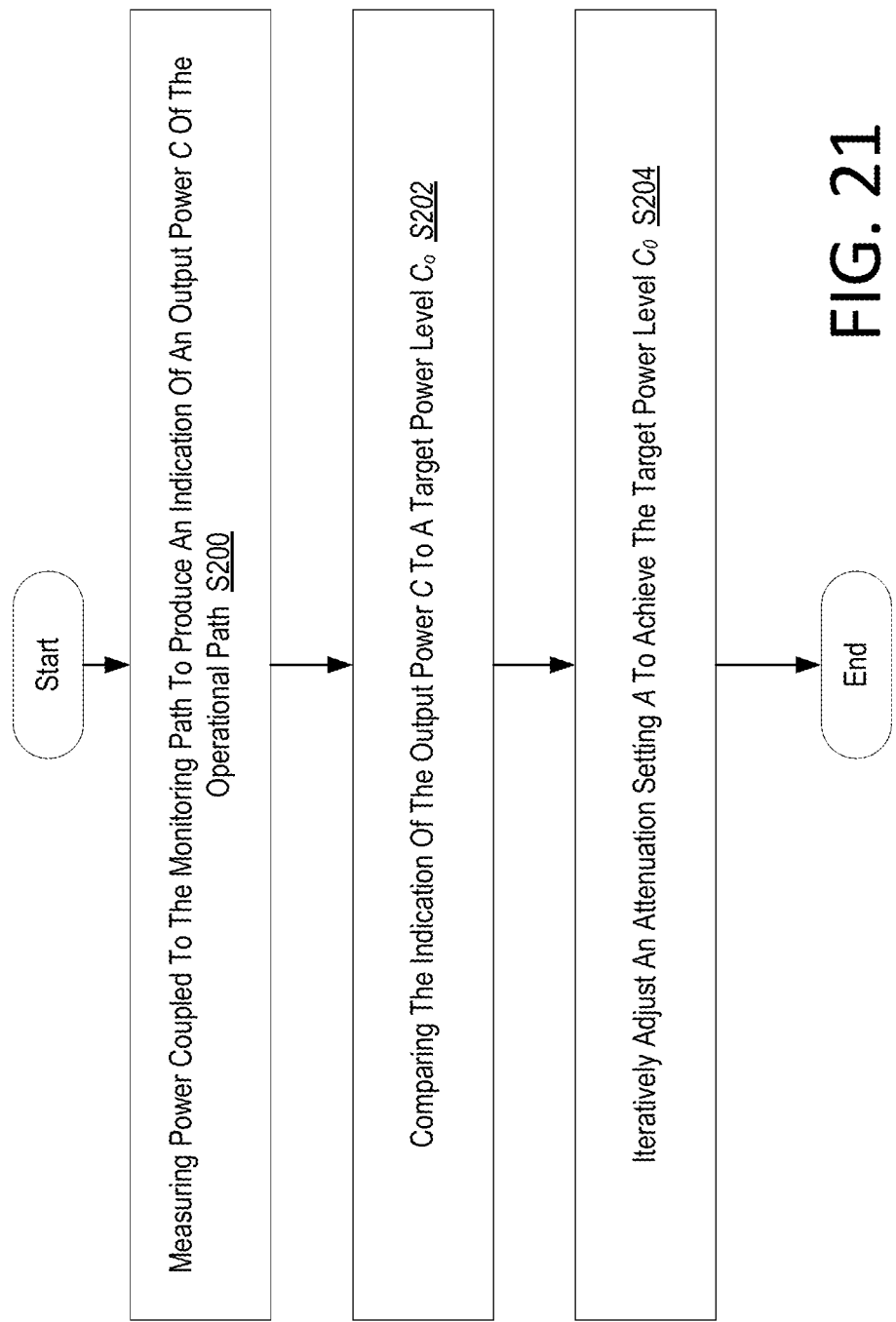

SYSTEM AND METHOD FOR CALIBRATION, MONITORING AND CONTROL OF AN ANECHOIC BOUNDARY ARRAY RF ENVIRONMENT SIMULATOR

CROSS-REFERENCE TO RELATED APPLICATION

This application is related to and claims priority to U.S. Provisional Patent Application Ser. No.: 62/163,674, filed May 19, 2015, entitled "SYSTEM AND METHOD FOR CALIBRATION AND MONITORING OF AN ANECHOIC BOUNDARY ARRAY RF ENVIRONMENT SIMULATOR", the entirety of which is incorporated herein by reference. This application also is related to and claims priority of U.S. Non-Provisional patent application Ser. No. 14/962,299, filed Dec. 8, 2015, entitled "SYSTEM AND METHOD FOR CALIBRATION AND MONITORING OF AN ANECHOIC BOUNDARY ARRAY RF ENVIRONMENT SIMULATOR", the entirety of which is incorporated herein by reference. This application also is related to and claims priority of U.S. Provisional Patent Application Ser. No. 62/492,637, filed May 1, 2017, entitled "AN IMPROVED SYSTEM AND METHOD FOR POWER CONTROL OF AN OVER-THE-AIR RF ENVIRONMENT EMULATOR," the entirety of which is incorporated herein by reference. This application also is related to and claims priority of U.S. Non-Provisional patent application Ser. No. 15/950,256, filed Apr. 11, 2018, entitled "SYSTEM AND METHOD FOR POWER CONTROL OF AN OVER-THE-AIR RF ENVIRONMENT EMULATOR," the entirety of which is incorporated herein by reference.

FIELD

A method and system for calibration, monitoring and controlling of a system for simulating electromagnetic environments such as an anechoic boundary array radio frequency (RF) environment simulator.

BACKGROUND

U.S. Pat. No. 8,331,869 describes a system and method for recreating any desired near-field RF environment such that the field arriving at a device under test appears to have arrived from a radiating far field. This approach is now commonly known as an anechoic boundary array method, due to the use of an anechoic chamber to isolate the simulated environment inside the chamber and due to the antennas arrayed about the central volume used to create the RF boundary conditions necessary to produce the desired near field condition.

While both passive and active realizations of the anechoic boundary array method have been used, the common approach uses advanced RF channel emulators to emulate spatial channel models in order to simulate the multipath environment outside the boundary array. These RF emulators were designed to be used for cabled testing of wireless radios and typically do not provide the output power or receiver sensitivity needed for radiated testing. In order to condition signals for testing over the air, amplifiers are used between the spatial channel emulators and the antennas of the boundary array, providing additional power and gain on downlink or uplink signals.

FIG. 1 illustrates a typical anechoic downlink-only boundary array configuration 10 wherein the antennas 12 and device under test (DUT) 14 are within an anechoic chamber shown encompassed by dashed lines. An object of a test of the DUT 14 may be to measure the performance of the antenna system of the DUT 14 in an environment that simulates multipath propagation. Thus, the DUT 14 may be, for example, a mobile phone for which over the air performance in a multipath environment is to be evaluated. The DUT 14 may be a device capable of multiple input multiple output (MIMO) reception and transmission, adaptive beam forming, and/or antenna diversity.

To test the DUT 14, a base station emulator 16 generates complex signals that emulate signals from a base station such as an eNodeB in a long term evolution (LTE) wireless communication network. The base station emulator 16 may also introduce interference signals. The signals from the base station emulator 16 are fed to spatial channel emulators 18a and 18b, referred to herein collectively as spatial channel emulators 18. The spatial channel emulators 18 introduce propagation and fading to the signals from the base station emulator, to emulate multipath propagation as would be experienced in a real world environment. Interfering signals may also be introduced within the channel emulator to simulate interference from other devices elsewhere in the environment.

The outputs of the spatial channel emulators 18 are fed to power amplifiers 20 which amplify the signals. Cables conduct the amplified signals from the power amplifiers to antennas 12 surrounding the DUT 14. The antennas 12 may be capable of dual polarization and transmission from any desired azimuth and elevation about the DUT 14. At least one uplink communication antenna 22 receives signals transmitted from the DUT 14 and transmits them to the base station emulator 16.

Alternate implementations of the system include an uplink only configuration, where the directions of propagation and orientation of active system components such as amplifiers and channel emulators are reversed; and bi-directional implementations where both uplink and downlink signal components are fed to/from the boundary array using either the same or different antennas.

Early implementations of the anechoic boundary array were designed with bypass switches which allowed routing the active and passive paths of the system to a centralized location. This provided options for calibrating the individual components, such as the power amplifiers 20, as well as for using the antennas of the boundary array for traditional passive antenna pattern measurements (APM) and over-the-air (OTA) performance testing of radiated power and sensitivity, with the switch array allowing for high speed changes in propagation direction in lieu of mechanical positioning of the measurement antenna or DUT.

An example of such a system is shown in FIG. 2, where different test equipment 17 can be routed through first switches 19 to the spatial channel emulator 18 and boundary array. In addition those same signals can be routed to bypass the spatial channel emulator 18 and amplifier 20 using the switches 19 to directly access the array antenna 12 via switches 21. Likewise, switches 21 may be used to route the output of the spatial channel emulator 18 and amplifier 20 back to test equipment 17 in order to measure path losses along the conducted paths. A switch 23 may also be used to route the output of the spatial channel emulator 18 to a device under test for conducted testing. Note that for simplicity return paths are not illustrated. A given instrument will have both input and output connections routed simultaneously along different routes of the possible paths offered by the switches 19, 21 and 23.

Unfortunately, the approach of using bypass switches to calibrate sub paths of the system suffers from a number of shortcomings, including the problem that static paths in the system must be independently calibrated to remove their RF impact from that of the desired path between the test equipment and the center of the test volume. Also, the use of switches to change the path between the measurement path and the calibration path results in changes in the electrical lengths of intervening cables, which in turn, results in a different standing wave contribution between the measurement path and the calibration path.

Traditional range calibration techniques for APM and OTA testing disfavor the use of component testing in favor of end-to-end calibrations. Hence, over time, techniques for performing full end-to-end calibrations of the boundary array were developed which eliminated the need for manual or automated component testing of the individual active and passive system components.

FIG. 3 shows a single path of the MIMO system of FIG. 1. The signal routing 24, 26a and 26b enable connections to different communication test equipment as well as to different antennas within the anechoic chamber. Routes for performing conducted testing of radios (not pictured) using the same channel emulator 18 are commonly employed, also. By measuring the total path loss of the system with a constant tap channel model with known loss terms in the channel emulator, the losses of the various components external to the channel emulator, such as the signal routing 24 and 25 and the power amplifier 20, can be determined. These losses may then be applied to the internal losses associated with any other channel model in order to determine the power correction needed for device testing.

FIG. 4 illustrates a typical end-to-end calibration process of the path of FIG. 3, where a reference antenna 28 with a known gain relative to an isotropic radiator/receiver is placed in the test volume and used to determine the net path loss. The additional path loss components due to transmit and receive cables and connectors, as well as the reference antenna gain and internal losses of the vector network analyzer 30 or other test equipment, must all be applied as corrections to the measurement in order to determine the desired total path loss. Alternately, the signal routing connections may be used to measure sub-components of the total path, given the necessary corrections for the additional path loss components involved in the different signal routings. While automating switching for this purpose provides for relatively quick measurements of the various paths, this approach is generally inconvenient to set up since each of the added loss terms, including the relative differences through the switches for the calibration signal path vs. the path to the test volume, must be determined independently (with the associated measurement uncertainty) and then assumed to never change throughout the life of the system.

Despite the elimination of the need for calibration of individual components by using and end-to-end calibration, the overall complexity of the boundary array system does point to the necessity of a mechanism for monitoring the performance of the system on a regular basis. Evaluation of the total field produced in the center of the test volume is a first order approach to determining system accuracy, but can't detect degradation in a single system component from the aggregate sum of all of the signals within the chamber. It also generally requires additional process steps by the user to place a reference antenna within the test volume and perform the power validation. Given the capabilities of a typical channel emulator, it is possible to utilize a probing antenna somewhere outside the test volume to iteratively evaluate the output of each element in the array, at the cost of the additional test time involved in enabling and disabling each output of the channel emulation. By referencing the result to a reference measurement performed after the original range calibration, it is then possible to perform a non-intrusive evaluation of any drift in the system components, although at the cost of additional test time.

SUMMARY

Methods and systems for power control in an electromagnetic test system are provided. According to one aspect, an electromagnetic measurement system for testing a device in a test region is provided. In an operational path extending between a port of a channel emulator and an antenna directed to the device: one of an amplifier/attenuator combination and a variable gain amplifier (VGA) in line with the operational path is provided and a coupler in line with the operational path, the coupler configured to couple a portion of energy from the operational path to monitoring circuitry is provided. A controller is configured to control an output power C of the operational path by setting one of the attenuator and the VGA to achieve an attenuation setting A. The controller is also configured to set the channel emulator output to a value B, such that C is a function of A and B. C is compared to a target power level $C_0$ and A and B are adjusted iteratively to achieve the target power level $C_0$ to within a specifiable tolerance. The system also includes monitoring circuitry configured to receive and measure power coupled to the monitoring circuitry by the coupler, the measured power being communicated to the controller as an indication of the output power C of the operational path.

According to this aspect, in some embodiments, a coarse adjustment of A and a fine adjustment of B is made to achieve the target power level $C_0$ within the specifiable tolerance In some embodiments, the system includes comparison circuitry configured to compare power measurements from a plurality of operational paths. In some embodiments, the controller is configured to set the channel emulator output B to a predetermined value. The predetermined value may, in some embodiments, be an upper output power limit of the channel emulator. In some embodiments, the predetermined value may be based on a maximum operating range of the power amplifier. In some embodiments, the predetermined value may be based on $P_{max}$. In some embodiments, the setting of the one of the attenuator and the VGA to achieve the attenuation value A is based on the indication of the output power C of the operational path received by the controller from the monitoring circuitry. In some embodiments, a setting of the attenuation setting A is calculated to reduce a range over which the channel emulator output power B is adjusted to achieve the target power level $C_0$. In some embodiments, the system includes a second coupler in line with the operational path, the second coupler having an input coupled to an output of the channel emulator, having a first output coupled to an input of the power amplifier, and having a second output coupled to a second monitoring path.

According to another aspect, a method for controlling an output of an operational path extending between a channel emulator and an antenna in an electromagnetic test system, the operational path including one of an amplifier/attenuator combination and a variable gain amplifier (VGA), a coupler and an antenna, the coupler configured to couple power to the antenna and to couple power to a monitoring path is provided. The method includes measuring power coupled to the monitoring path to produce an indication of an output power C of the operational path. The method further includes comparing the indication of the output power C to a target power level $C_0$ and iteratively adjusting at least one of the attenuator setting A and an output power of the channel emulator to achieve the target power level $C_0$ to within a specifiable tolerance.

According to this aspect, in some embodiments, a coarse adjustment of A and a fine adjustment of B is made to achieve the target power level $C_0$ within the specifiable tolerance. In some embodiments, the method also includes setting an output power B of the channel emulator to a predetermined value. The predetermined value may, in some embodiments, be an upper output power limit of the channel emulator. In some embodiments, the predetermined value may be based on a maximum operating range of the power amplifier. In some embodiments, the predetermined value may be based on $P_{max}$. In some embodiments, the attenuation setting A is calculated to reduce a range over which the channel emulator output power B is adjusted to achieve the target output power level $C_0$ to within a specifiable tolerance. In some embodiments, the operational path includes a second coupler having an input coupled to an output of the channel emulator and having a first output coupled to the one of the amplifier/attenuator combination and the VGA, and having a second output coupled to a second monitoring path. In some embodiments, the method includes comparing the second output to the indication of the output power C to determine a gain of the operational path.

According to another aspect, a system for simulating electromagnetic environments is provided. The system includes a channel emulator having a plurality of outputs, each output associated with a different operational path, each operational path having: one of an amplifier/attenuator combination and a variable gain amplifier (VGA) coupled to an output of the channel emulator and a coupler configured to couple first power from an output of the one of the amplifier/attenuator combination and the VGA to an antenna and to couple second power from the output of the one of the amplifier/attenuator combination and the VGA to a first monitoring path. The system also includes an antenna in communication with a test region of the system. The system also includes a controller configured to control an output power C of the operational path by setting one of the attenuator and the VGA to achieve an attenuation setting A. The controller is also configured to set the channel emulator output to a value B, such that C is a function of A and B. C is compared to a target power level $C_0$ and A and B are adjusted iteratively to achieve the target power level $C_0$ to within a specifiable tolerance.

According to this aspect, in some embodiments, a coarse adjustment of A and a fine adjustment of B is made to achieve the target power level $C_0$ within the specifiable tolerance. In some embodiments, the system further includes a measurement device coupled to the first monitoring path, the measurement device providing a measurement of an output of the power amplifier in the operational path, the measurement providing an indication of the output power C. In some embodiments, the setting of the one of the attenuator and the VGA to achieve the attenuation value A is based on the indication of the output power C of the operational path received by the controller from the monitoring circuitry. In some embodiments, the system also includes comparison circuitry configured to compare power measurements from a plurality of operational paths. In some embodiments, the controller is configured to set the channel emulator output B to a predetermined value. The predetermined value may, in some embodiments, be an upper output power limit of the channel emulator. In some embodiments, the predetermined value may be based on a maximum operating range of the power amplifier. In some embodiments, the predetermined value may be based on $P_{max}$. In some embodiments, a setting of the attenuation setting A is calculated to reduce a range over which the channel emulator output power B is adjusted to achieve the target power level $C_0$ to within a specifiable tolerance.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein:

FIG. 9 illustrates a configuration for measurement of power for calibration in an uplink configuration;

FIG. 21 is a flowchart of an exemplary process for implementing power control in an electromagnetic test system.

DETAILED DESCRIPTION

Figure 1:
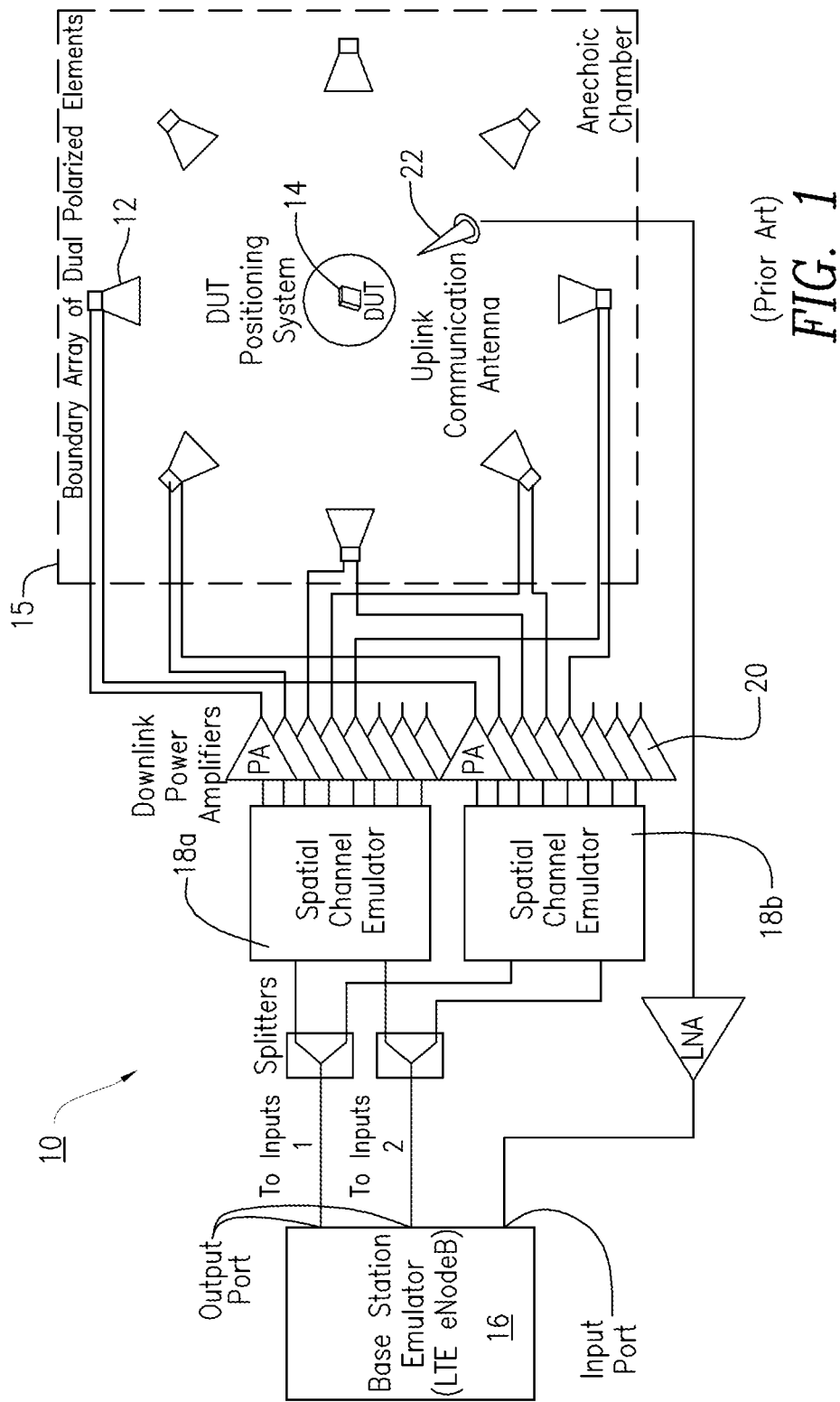
FIG. 1 illustrates a known system for simulating electromagnetic environments commonly referred to as an anechoic boundary array test apparatus.
Figure 2:
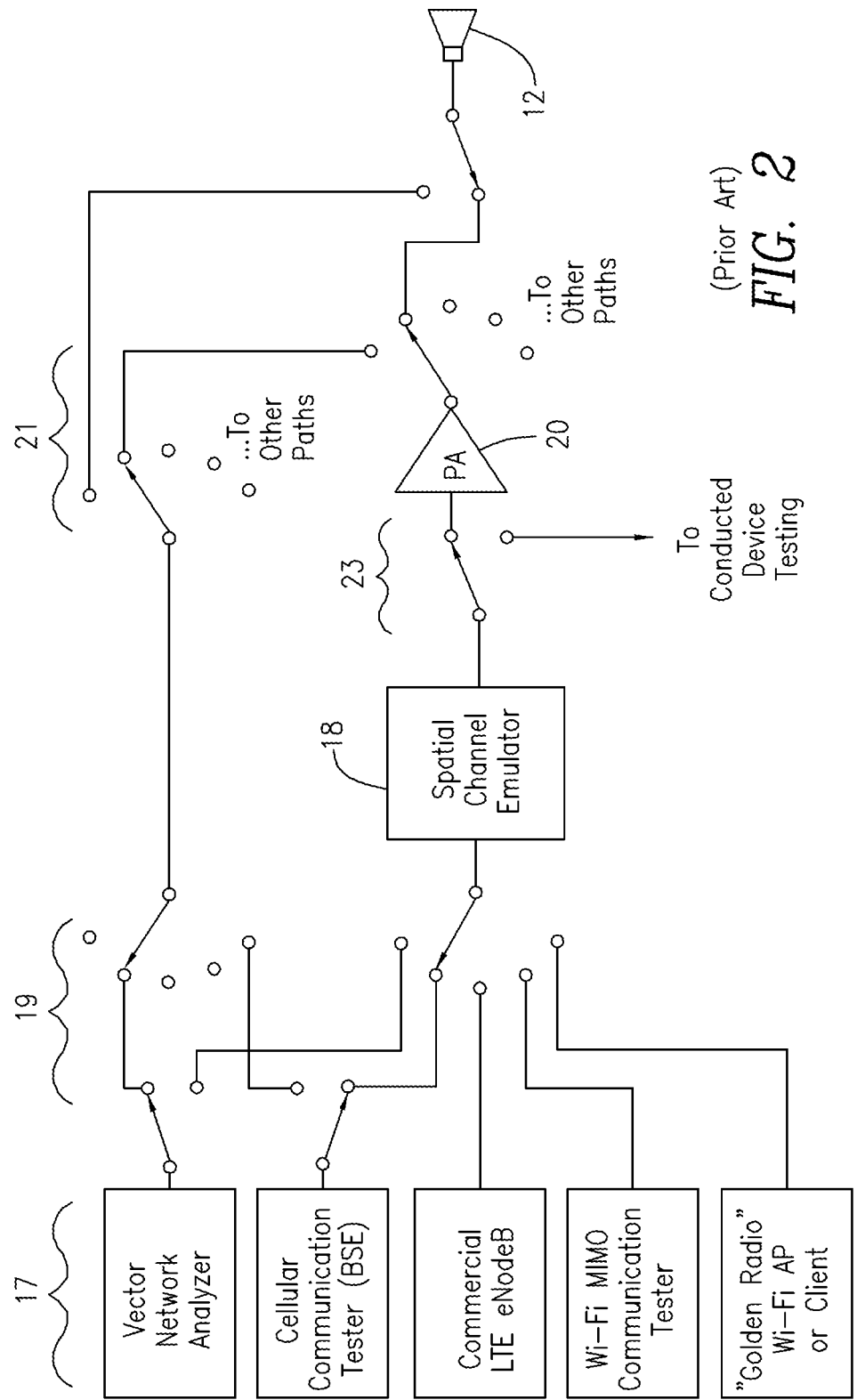
FIG. 2 illustrates known switching for offline calibration of portions of an operational path of a system for simulating electromagnetic environments.
Figure 3:
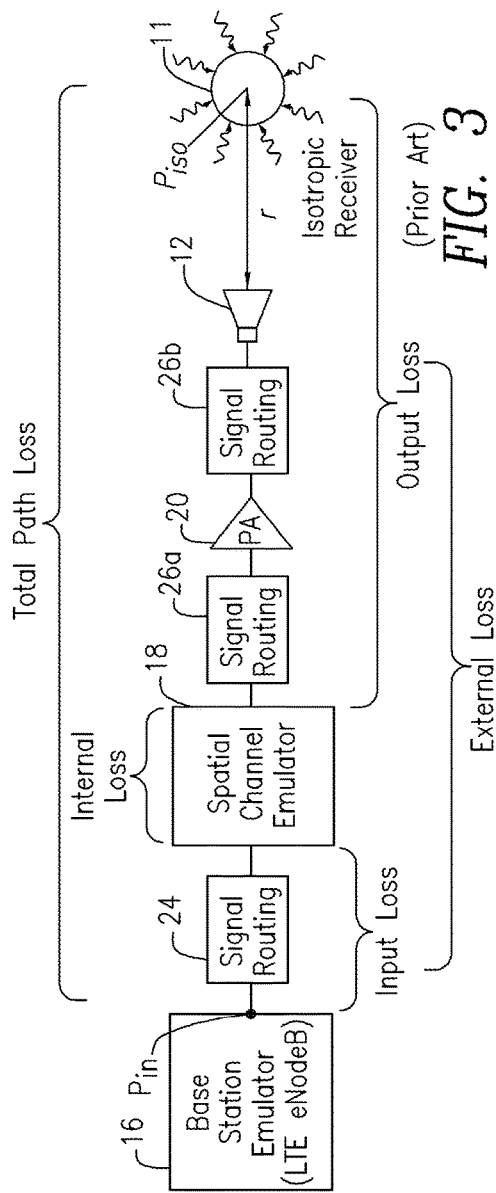
FIG. 3 illustrates a known individual path of a system for simulating electromagnetic environments with signal routing.
Figure 4:
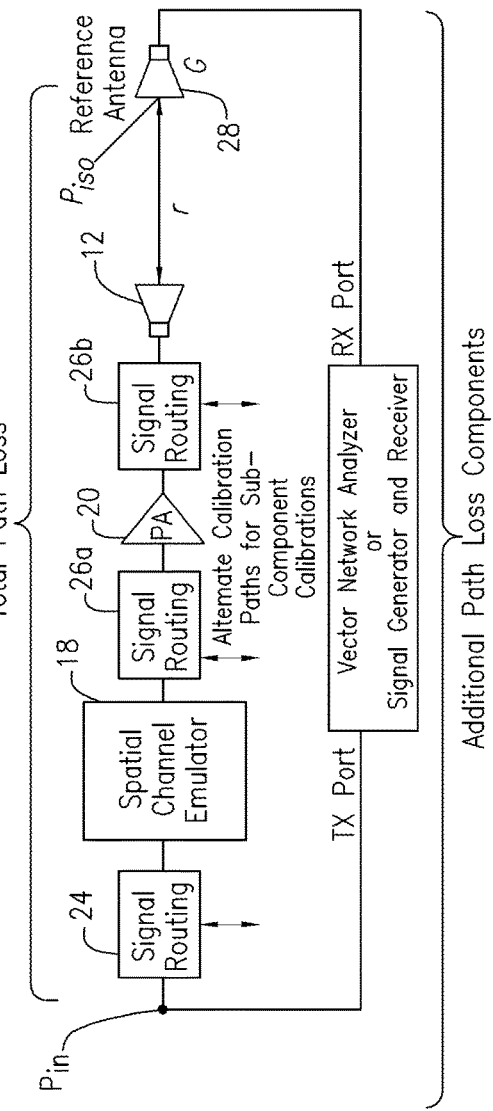
FIG. 4 illustrates a known end-to-end calibration test configuration for an individual path of a system for simulating electromagnetic environments.

Before describing in detail exemplary embodiments, it is noted that the embodiments reside primarily in combinations of apparatus components and processing steps related to calibration and monitoring of active components in a system for simulating electromagnetic environments. Accordingly, the system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments described herein, conducted paths are provided for evaluating potential drift of active components of a system for simulating electromagnetic environments, where the active components are likely to exhibit variations and instabilities, without altering the standing wave contributions of the various passive paths that were calibrated out in an end-to-end path loss measurement. Although some embodiments refer to anechoic boundary array test apparatus, embodiments are not limited to such apparatus, but rather, apply generally to systems for simulating electromagnetic environments.

Figure 5:
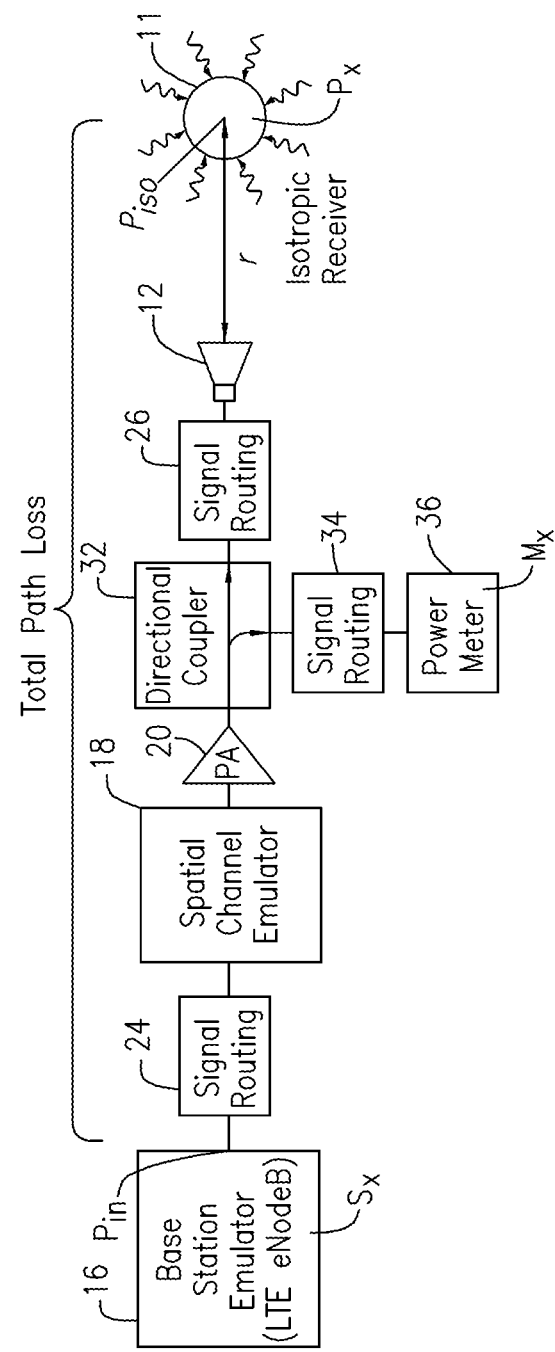
FIG. 5 illustrates an embodiment for measurement of the output power of an active portion of a path of system for simulating electromagnetic environments.

FIG. 5 illustrates an embodiment having a coupling apparatus such as a directional coupler 32 that couples energy from the power amplifier 20 to the signal routing 26 and to signal routing 34 of an alternative path that couples the power sampled by the directional coupler 32 to a power meter 36. Note that although a directional coupler is shown in the drawing figures, other embodiments may include splitters, circulators, or other passive or active coupling devices either as discrete cabled devices, embedded components in other system components, or even field probing antennas coupled to each antenna in the chamber. The path that includes the path from the power amplifier 20 to the antenna 12 is referred to herein as the operational path, whereas the path that includes the path from the power amplifier 20 to the power meter 36 is referred to herein as the monitoring path.

Figure 6:
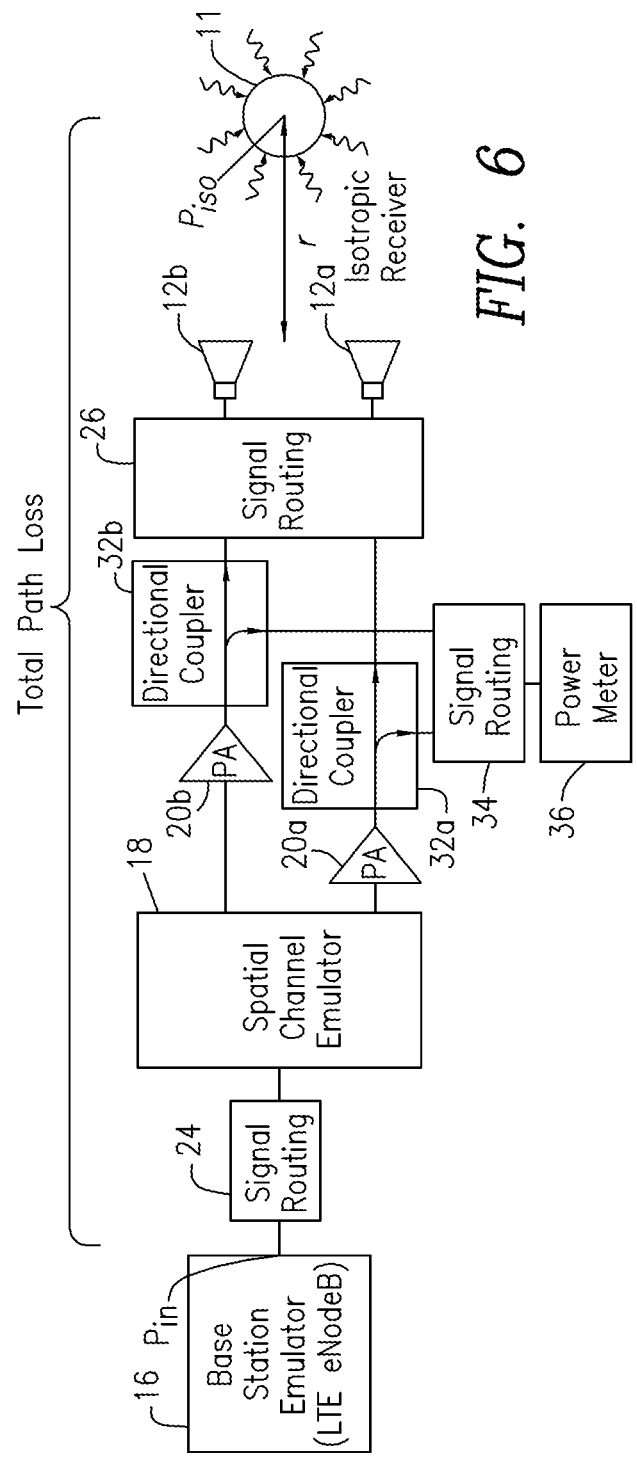
FIG. 6 illustrates an embodiment for measurement of output power of each of multiple paths of system for simulating electromagnetic environments.

The signal routing 34 may include a multiplexing switch matrix or a power combiner, for example. In this way, the power output of an active path can be evaluated in real time to confirm proper operation. In some embodiments, a directional coupler 32 may be at the output of each amplifier 20 with the outputs of a plurality of test ports of the directional couplers 32 combined by a switch matrix and fed to a single power meter 36. In some embodiments, there is a directional coupler 32a, 32b for each operational path and a single power meter receiving signals from each directional coupler 32a, 32b, as shown in FIG. 6. In an alternative embodiment, there is a separate power meter to measure the power of the output of each directional coupler 32a, 32b separately. In some embodiments, the outputs of the directional couplers directed to one or more power meters may be compared to each other.

Thus, during end-to-end OTA calibration, a reference level can be determined at the output of each amplifier 20 based on the power settings of the vector network analyzer 30 or other test equipment used in the calibration and settings of the channel emulator 18. By comparing the relative power levels of the individual paths measured by the power meters 36 subsequent to the end-to-end calibration to the power levels determined at the time of end-to-end calibration, any drift in the active path can be determined and corrected. This may include, not only drift of the power amplifier gain, but also variations of cables, switches and other operational path components. In other words, through the use of broadband power meters or similar sensing devices, the system 10 can be evaluated in real time to provide feedback and allow for compensation at the output of the channel emulator as needed.

The use of the power meter as a calibration tool may be understood as follows. If the difference, Lx, between the signal level in the test volume 11 and the signal level at the power meter 36 is known, (i.e., loss due to the directional coupler and associated cables are known or cancelled out when monitoring drift of the amplifier), for each path, then a path should be producing a power Px in the test volume 11. Then, the power meter 36 may produce a measured power, Mx=Px-Lx. In principle, the total power in the test volume 11 can be determined from all the measurements, Mx, to determine if the expected power levels are being produced in the test volume 11. Between the signal source Sx 16 and the test volume 11, there is amplification and loss, Ax, so that Px=Sx+Ax. In some applications, knowledge of Px is all that is desired. However, one can determine Mx=Sx+Ax-Lx. Since Sx and Lx are constant for a given path and setting, Mx is proportional to Ax. If the amplifier 20 varies, the measurement at the power meter 36 will vary accordingly. Thus, compensation of the amplifier gain can be made based on the measured power at the power meter 36. It should also be noted that it is not in fact necessary to know the various losses Lx and amplifications Ax when the primary concern is to ensure stability of the signals Px. Any changes in the measured signals Mx from their known reference values imply corresponding changes in Px that may be compensated for by altering Sx accordingly to return Mx to the original reference values.

Figure 7:
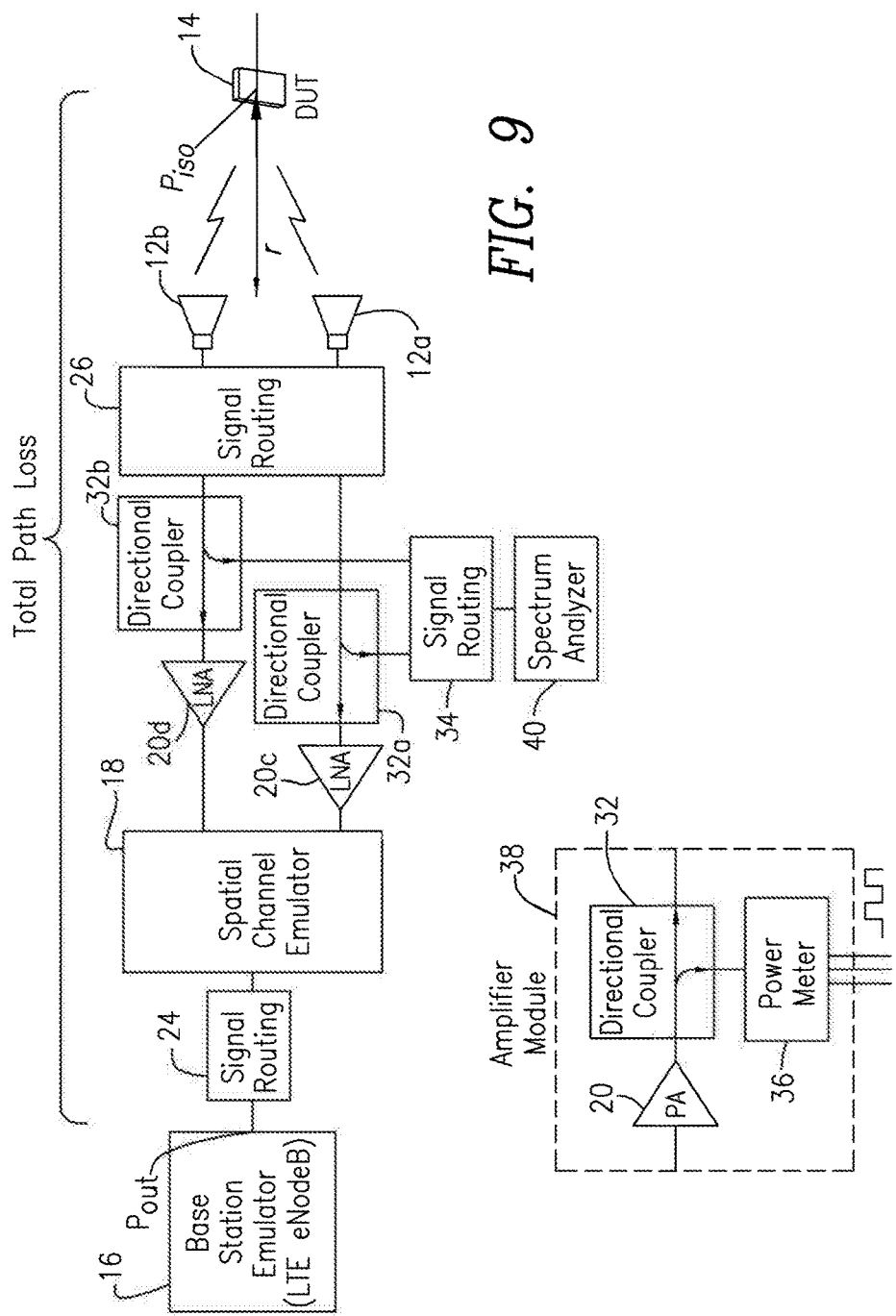
FIG. 7 illustrates an amplifier module having an integrated power amplifier, directional coupler and power meter.

In some embodiments, the amplifier 20, the directional coupler 32 and the power meter 36 can be combined in a single integrated component 38, as shown in FIG. 7, so that each channel of the system 10 can be monitored digitally, without the need for external cabling, switching or test equipment.

Figure 8:
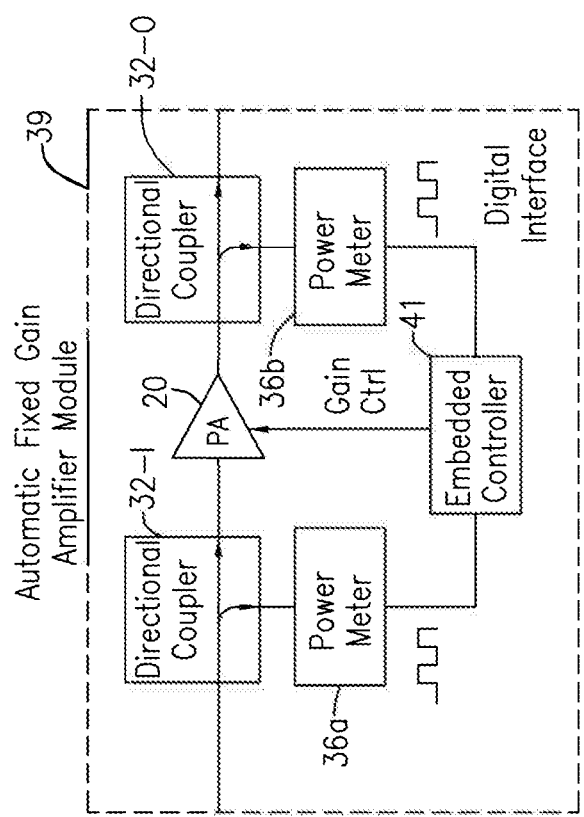
FIG. 8 illustrates an automatic amplifier gain measurement and adjustment apparatus.

In some embodiments, closed loop automatic gain control using an embedded controller may be implemented to provide feedback to adjust a gain of a power amplifier 20 whose output is measured by the power meter. Such an embodiment is shown in FIG. 8. Referring to FIG. 8, an automatic fixed gain amplifier module 39 includes an embedded controller 41 that receives an output of the power meters 36a and 36b and produces a gain control signal that adjusts the gain of the corresponding power amplifier 20. In the embodiment of FIG. 8, a directional coupler 32-I may be placed between the channel emulator 18 and the power amplifier 20 to couple a portion of the power output from the channel emulator 18 to the power meter 36a. A second directional coupler 32-O is placed at the output of the amplifier 20 to couple a portion of the power output of the power amplifier 20 to the power meter 36b. The difference between the output of the directional coupler 32-I and the output of directional coupler 32-O after the power amplifier 20 gives an estimate of the amplifier gain. This gain may be adjusted as needed to compensate for gain drift. Note that a splitter or similar component can be used instead of a directional coupler. Note also that the circuit of FIG. 8 can be used in the uplink configuration discussed with reference to FIG. 9. Note also that instead of, or in addition to, adjusting gain of the power amplifier 20, a gain of the channel emulator 18 may be adjusted to compensate for drift from calibrated values.

The gain adjustment may be based on a comparison of the calculated gain to a predetermined calibration value to determine if the gain of the power amplifier 20 has drifted over time. The predetermine calibration value may be determined at a time of performing an end-to-end calibration of the system 10. The gain control can be implemented by a combination of hardware and software. The directional couplers 32-I and 32-O, the power meters 36a, 36b, the power amplifier 20 and the embedded controller 41 can be integrated into a single module 39.

In some embodiments, feedback from the power meter 36 may be used to adjust an output level of the channel emulator 18. In such embodiments, in a normal mode of operation, test software executed by the channel emulator 18 introduces offsets to each output of the channel emulator 18 based on calibration corrections determined for each path. The use of the power meter 36 to monitor drift may allow real time adjustments to the calibration corrections.

An uplink path implementation is shown in FIG. 9. A device under test 14 radiates uplink signals captured by the antennas 12a and 12b. Note that in some embodiments fewer or more antennas may be implemented. Signal routing equipment 26 routes the uplink signals to first and second direction couplers 32a, 32b. A first portion of the uplink signal energy in each operational path is amplified by a low noise amplifier, 20c and 20d, and sent to the spatial channel emulator 18. A second portion of the uplink signal energy in each operational path is coupled to the signal routing equipment 34. This signal may then be monitored by a sensitive receiver, spectrum analyzer 40, or power meter or power sensor 36 to determine the input level to the amplifiers 20c and/or 20d. Since the input to most channel emulators also operate as a power meter, a separate power meter tap after an amplifier 20c, 20d, may not be necessary, although one may be used to monitor the output independently, if desired.

Thus, in the uplink configuration of FIG. 9, a test signal path is from the center of the test volume 11 where the device under test, (DUT) 14, is located to the base station emulator. The path that includes the path from the antenna 12 to the LNA 20 is the operational path, whereas the path that includes the path from the antenna 12 to the spectrum analyzer 40 is the monitoring path. The path loss along the test signal path is assumed to be known so that the power at the base station emulator 16, P_TE, is the power radiated from the test volume, P_OTA minus the path loss. However, if the amplifier 20 or other components drift, the path loss changes from its known value. To determine if there is drift of these components, a comparison can be made between the power received at the base station emulator 16 to the power injected to the amplifier 20. To perform this comparison in real time, i.e., during a test of the DUT 14, the directional coupler 32 taps a portion of the power from the test volume and the spectrum analyzer 40 measures that portion of the power. The remaining power from the directional coupler 32 is coupled to the amplifier 20 which amplifies the signal. The output of the amplifier 20 is input to the spatial channel emulator 18 and measured by a power meter within the spatial channel emulator 18. Therefore, the input to the amplifier 20 can be compared to the output of the amplifier 20 to monitor any drift of gain of the amplifier 20.

Thus, some embodiments advantageously provide a method and apparatus for determining a calibration state of each of at least one operational path in a system for simulating electromagnetic environments, where each operational path has an antenna 12 in communication with a test region, and where the calibration state of at least a portion of an operational path is determined without interruption of a portion of a power amplifier output signal coupled to the antenna 12.

In some embodiments, a system for simulating electromagnetic environments, such as an anechoic boundary array test apparatus, includes a channel emulator 18 having an output for each operational path. Each operational path includes at least a power amplifier 20, an antenna 12 and a first coupling apparatus 32 interposed between the power amplifier 20 and the antenna 12. The power amplifier 20 has an input coupled to an output path of the channel emulator 18. The power amplifier 20 has an output signal. The antenna 12 is in communication with the test region and configured to receive a first portion of the power amplifier output signal. The first coupling apparatus 32 has an input and at least two outputs and is configured to simultaneously couple the first portion of the power amplifier output signal to the antenna 12 and a second portion of the power amplifier output signal to a first monitoring path when the first portion of the power amplifier output signal is being coupled to the antenna 12, so that a calibration state of at least a portion of the operational path can be determined without interruption of the first portion of the power amplifier output signal coupled to the antenna 12.

In some embodiments, a first measurement device 36 in the first monitoring path is configured to measure the second portion of the power amplifier output signal. In some embodiments, the first measurement device 36 is combined with the first coupling apparatus 32 and the power amplifier 20 in a package install-able between the channel emulator 18 and the antenna 12.

In some embodiments, the apparatus further includes a second coupling apparatus 32-I having an input coupled to an output of the channel emulator 18, having a first output coupled to an input of the power amplifier 20, and having a second output coupled to a second monitoring path. In such embodiments, the apparatus may further include a controller 41 coupled to the first and second monitoring paths and configured to compare an output of the first coupling apparatus 32-O to an output of the second coupling apparatus 32-I to produce a gain control signal to control a gain of the power amplifier 20. In such embodiments, the gain control signal may be based at least in part on a stored calibration value. In such embodiments, the gain control signal may be set by the controller 41 so that the output of the first coupling apparatus 32-O coupled to the first monitoring path is about equal to the stored calibration value.

In some embodiments, a method of calibration of an anechoic boundary array test apparatus having a plurality of antennas 12 in communication with a test region is provided where each antenna 12 is in a different operational path of the apparatus. Each operational path has a power amplifier 20, a coupling device 32 and an antenna 12. The coupling device 32 is configured to simultaneously couple power to the antenna 12 and to a first monitoring path so that signal flow through the operational path is not interrupted when a signal in the first monitoring path is coupled to a power sensor 36. The method may include measuring power coupled to the first monitoring path while signal flow through the operational path is not interrupted and comparing the measured power to an expected value.

In some embodiments, the method further includes adjusting a gain of the power amplifier 20 in the operational path based on a result of the comparison. In some embodiments, the predetermined calibration value is based on a path loss measurement of an operational path that includes providing a reference antenna 28 in communication with the test region, the reference antenna 28 configured to receive power radiated into the test region by the antenna 12 in the operational path. In some embodiments, determining the path loss includes providing a network analyzer 30 or other signal generator/receiver combination having a receive port coupled to the reference antenna 28 and a transmit port coupled to an input of the operational path. In some embodiments, the method further includes determining an input calibration power level of the power amplifier 20 in the operational path.

In some embodiments, a system for simulating electromagnetic environments is provided that includes a channel emulator 18 having a plurality of outputs, each output associated with a different operational path. Each operational path has a power amplifier 20, an antenna 12 and a first coupling mechanism 32. The power amplifier 20 is coupled to an output of the channel emulator 18. The antenna 12 is in communication with a test region of the apparatus. The first coupling mechanism 32 simultaneously couples power to the antenna 12 and to a first monitoring path when the operational path is coupled to the test region, so that a calibration state of at least a portion of the operational path can be determined without interruption of a signal coupled to the antenna 12 in the operational path.

In some embodiments, the apparatus further includes a measurement device 36 coupled to the monitoring path, the measurement device 36 providing a measurement of an output of the power amplifier 20 in the operational path. In some embodiments, the apparatus further includes a comparator configured to compare the measurement to a calibration value. In such embodiments, the apparatus may further include a gain control device configured to adjust the gain of the power amplifier based on the comparison. The comparator and the gain control device may be included in an embedded controller 41. In such embodiments, the gain of the power amplifier 20 may be set so that the measure of the output of the power amplifier 20 is about equal to the calibration value. In some embodiments, the apparatus further includes a second coupling mechanism 32-I to couple an output of the channel emulator 18 to a second monitoring path. In such embodiments, a signal on the second monitoring path may be compared to a signal on the first monitoring path to determine an adjustment to a gain of the power amplifier 20.

Note that a similar methodology can be employed on the uplink path. Thus, in some embodiments, a system for simulating electromagnetic environments is provided to determine a calibration state of at least one operational path. The calibration state of an operational path is determined without interruption of a portion of a signal from an antenna 12 to an amplifier 20 in the operational path. The apparatus includes a channel emulator 18 having an input for each operational path. Each operational path includes an antenna 12 in communication with the test region and configured to receive uplink signals from a device under test 14 in the test region. Each operational path also includes an amplifier 20 having an output coupled to an input of the channel emulator 18 and having an input to receive a first portion of the uplink signals from the antenna 12. Each operational path also includes a first coupling apparatus 32 having an input receiving uplink signals from the antenna 12, and having at least two outputs. The coupling apparatus is configured to simultaneously couple the first portion of the uplink signals to the amplifier 20 and to couple a second portion of the uplink signals to a first monitoring path when the operational path is being used to test a device 14 in the test region, so that a calibration state of at least a portion of the operational path can be determined without interruption of the first portion of the uplink signals coupled to the amplifier 20.

In some embodiments, the apparatus further includes a first measurement device 40 in the first monitoring path configured to measure the second portion of the uplink signals. In some embodiments, the first measurement device 40 is combined with the first coupling apparatus 32a and the power amplifier 20a in a package install-able between the channel emulator 18 and the antenna 12a.

In some embodiments, a method is provided for monitoring calibration of a system for simulating electromagnetic environments having a plurality of antennas 12 in communication with a test region, each antenna 12 in a different operational path of the apparatus. Each operational path may have an amplifier 20, a coupling device 32 and an antenna 12. The coupling device 32 is configured to simultaneously couple power from the antenna 12 to a first monitoring path so that a signal flow through the operational path is not interrupted when a signal in the first monitoring path is coupled to a power sensor 40. The method includes measuring power coupled to the first monitoring path while signal flow through the operational path is not interrupted; and comparing the measured power to an expected value.

Figure 10:
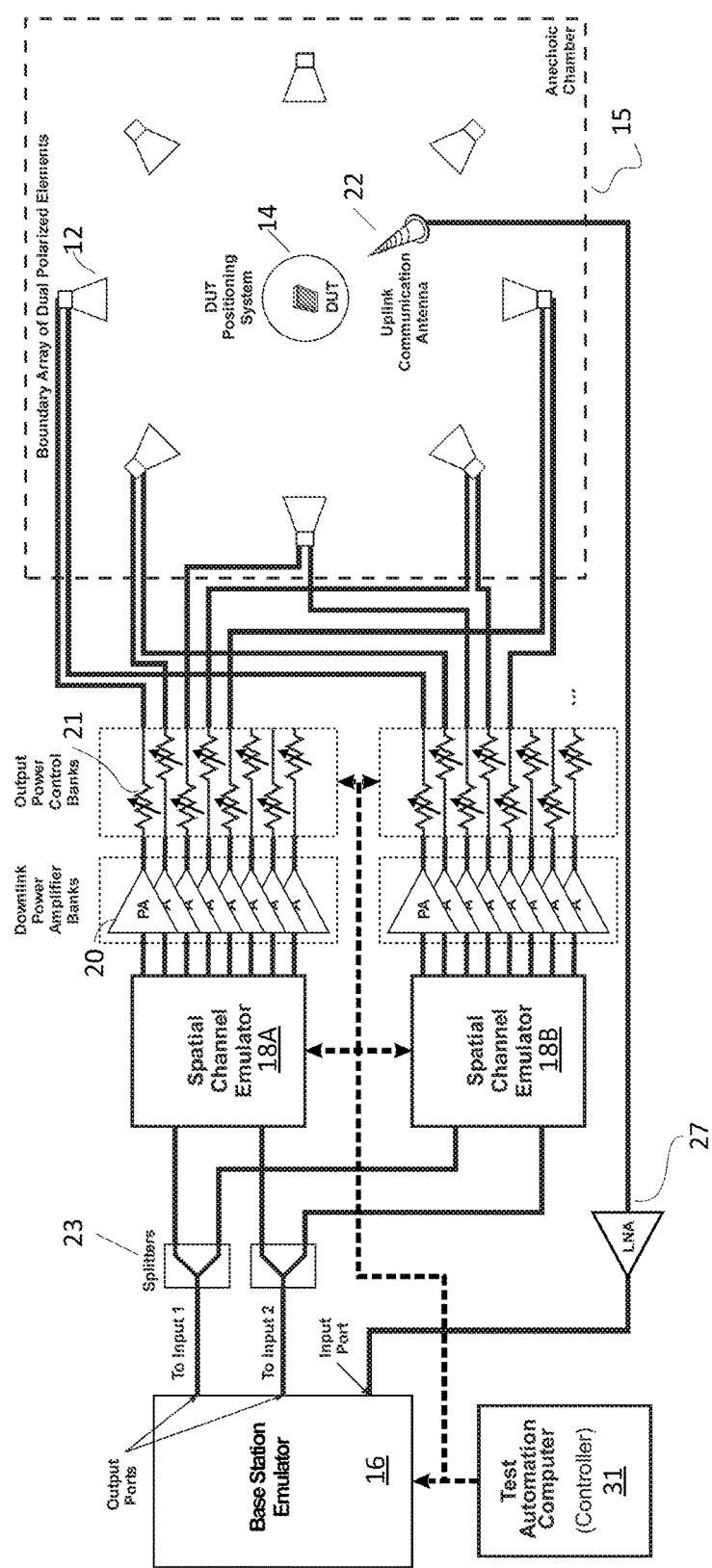
FIG. 10 is a block diagram showing introduction of a bank of attenuators placed at the output of the amplifiers.

FIG. 10 is a block diagram showing introduction of a bank of attenuators 21 placed at the output of the amplifiers 20. For example, an electro-mechanical step attenuator with fixed steps (e.g., 10 dB) may be placed at the output of each amplifier 20. The variable attenuator 21 may be a single off-the-shelf component, or comprised of a series of fixed attenuators and switches to create the desired range of attenuation settings. The attenuator 21 could be controlled in conjunction with the power amplifier 20 and/or the output signal source from spatial channel emulator 18 to ensure that no output power is applied when the attenuator switches, since damage to either the attenuator 21 and/or amplifier 20 might occur while the switches are open circuit. Note that the amplifier output may be disabled by a number of different means, including powering off the amplifier module externally, using an internal disable function that powers down or disconnects one or more internal gain stages, and/or disabling the input signal from the channel emulator output. Thus, the variable attenuator 21 may be adjusted to achieve coarse gain control, while the output power control of the output ports of the channel emulator 18 would then be adjusted over a greatly reduced range (e.g. 0-9.9 dB in 0.1 dB steps) to fill in the fine resolution required for the overall power control.

Thus, an algorithm in the test automation computer 31 would interpret a request for a given power level in the test volume as the need to set an attenuator 21 to a given setting A, disabling and re-enabling the amplifier 20, amplifier output, and/or channel emulator 18 output as needed during that process, and the output level of an output of the channel emulator 18 to an output power B, such that the resultant output power $C=B-A$ corresponds to the requested output level, exclusive of any constant offsets K, such as the amplifier gain and cable losses. Any corrections for net path loss or relative loss at each stage of the attenuator 21 setting may also be applied in the control process to linearize the resulting output power and accurately produce the desired power level in the test volume.

In another embodiment, a digital step attenuator may be used on the output of the amplifier 20. These solid state devices may be subject to a minimum internal loss that usually introduces a minimum insertion loss of 5-10 dB. Thus, in order to avoid losing the maximum output power of the power amplifier (the most expensive part of the amplifier) for signal to interference ratio (SIR) testing, a pair of RF switches may be used with each attenuator 21 to be able to switch each variable attenuator 21 out of the circuit and bypass the attenuator 32 for full output signal.

In addition, the VSWR of these switches can be quite high, depending on the design, and their maximum power handling capability is typically limited, making them incompatible with a direct connection to the output of high power amplifiers. Thus, additional fixed attenuation may be required to better match the attenuator 21 to the amplifier 20 and avoid damage to either part. This introduces a large step between the maximum power output and the first power level that can be controlled by the variable attenuator 21. While digital attenuators typically have finer step sizes (e.g. down to 0.1 dB resolution is common) such that they may be suitable for the total power control of the sensitivity search, they can only be used when the desired output power is on the order of 10 dB below the maximum output of the amplifier 20, at best.

Thus, a controlling algorithm in the test automation computer 31 described above could use the output level control of the channel emulator 18 up to the point where it would be safe to switch the attenuator 21 into the system. Note that this may be well below the maximum output power of the channel emulator 18, depending on the power handling capability of the attenuator 21. In order to switch the attenuator into or out of the circuit, the amplifier 20 or amplifier output, and/or output of channel emulator 18 may need to be disabled to avoid damage to itself and the switches used to switch the attenuator in or out of the circuit. When the attenuator 21 is switched into the circuit, the algorithm must increase the output level of the channel emulator 18 to compensate for the associated minimum insertion loss of the attenuator 21 (while remaining below the damage level of the attenuator 21), and then system power control may be continued linearly from that point using the digital control of the attenuator 21, or, if necessary depending on the resolution of the digital attenuator 21, combining the attenuator 21 and channel emulator output control as described in the previous embodiment.

A third embodiment would move the attenuation/power control into the amplifier itself, providing a variable gain amplifier design. This may be accomplished, for example, through the use of a digital attenuator or similar power control, either in the main signal path between the earlier gain stages, or in the feedback loop of one of the gain stages. Such an implementation could take into account the impact on the amplifier noise figure. Since attenuating the RF signal earlier in the chain may reduce both the signal and noise from the channel emulator 18 equally, the amplifier 20 may introduce its own noise floor to the resulting signal. If the attenuation is performed too early in the signal chain, the resulting SNR at the output of the amplifier 20 may still be worse than that needed in the test volume. The system level control will be similar to that described above, although in this implementation, the gain of the amplifier can be expected to vary from its maximum value to its minimum in whatever steps are chosen for the power control. Thus, the control algorithm can be expected to be closer to that of the first embodiment, but typically without disabling the amplifier or input signal while changing gain.

In each implementation, frequency dependent corrections for the actual attenuation at each step (i.e. frequency dependent non-linearity) may be applied to improve the overall system accuracy by adjusting the applied attenuation, gain, and/or signal generator settings to compensate for any error in a given target level.

Note that the control and automation of the various components as described above may be centralized in the controlling test software of the test automation computer 31, or distributed among the various embedded components. Multiple attenuators 21 or amplifiers 20 and attenuators 21 may be ganged together in a single output power control module, thereby simplifying overall interface and control. Corrections for the linearity of the variable attenuators 21 as well as any relative offsets between different paths, etc. may be stored in the embedded firmware of an embedded controller of the attenuators or variable gain amplifier bank, either for automatic internal correction or for use by external control software, and used to translate the resulting step settings to the desired quantities for each target frequency, transparent to the user or controlling software.

By moving the power control to the final output stage of the active components of the electromagnetic test system (e.g., the amplifiers 20), the entire signal to noise ratio of the system is kept constant as the signal is attenuated in the test volume. This ensures that regardless of the desired signal level in the test volume, the SNR due to the system should be much better than that due to the inherent platform noise at the DUT receiver. In other words the system noise floor will be well below the DUT platform and receiver noise when the signal is near the receiver sensitivity of the DUT 14.

By keeping the signal from the channel emulator 18 constant, the linearity of the amplifier 20 no longer plays a significant part in the overall system measurement uncertainty, since the average amplifier input and output power remain constant.

Adding the power control/attenuation to the amplifier 20 or after the amplifier 20 also resolves the frequency dependence of the gain and net path loss of the system, allowing the desired net amplifier gain to be adjusted according to the needs of the given frequency dependent path loss. The system amplifier gain can also be tuned to the needs of a specific channel emulator model.

Using the nested power control approach, where the attenuation/gain control at the amplifier output is moved in larger steps and fine control is produced through the channel emulator 18, helps to reduce the overall cost of the added power control components (e.g., attenuators 21) while still keeping the linearity and system SNR contributions at a minimum due to the small dynamic range utilized at the outputs of the channel emulator.

Figure 11:
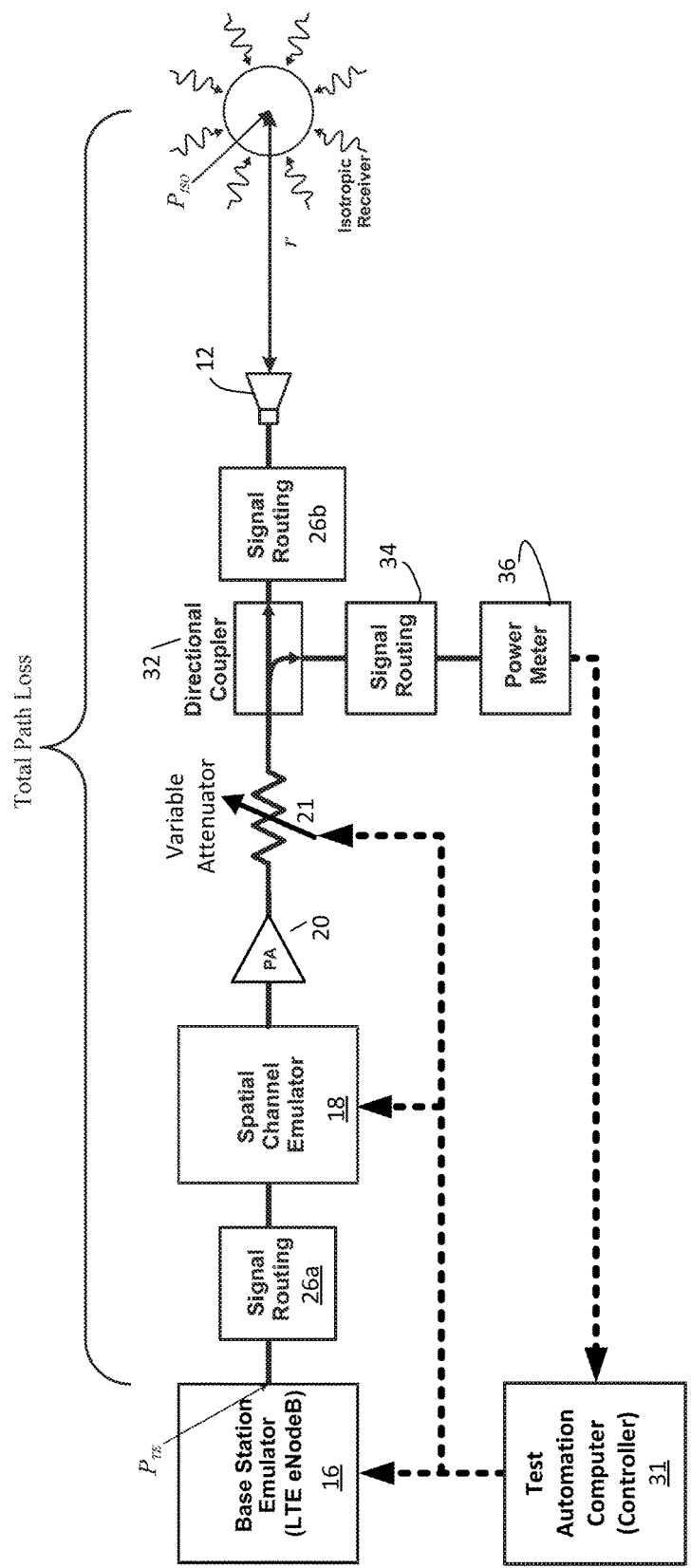
FIG. 11 illustrates an operational path having a variable attenuator interposed between the power amplifier and the directional coupler.

FIG. 11 illustrates an operational path having a variable attenuator 21 interposed between the power amplifier 20 and the directional coupler 32. As explained below, introduction of the directional coupler 32 and power meter 36 enables monitored control of an output power. Further, the power amplifier 20/variable attenuator 21 combination may be replaced by a variable gain amplifier (VGA). Note that the operational path shown in FIG. 11 may be duplicated for each antenna 12 in the boundary array test apparatus. In the operational path of FIG. 11, the test automation computer 31 acts as a controller to control an output power C of the operational path by setting one of the attenuator and the VGA to achieve an attenuation setting A. The controller 31 is also configured to set the channel emulator output to a value B, such that C is a function of A and B. C is compared to a target power level $C_0$ and A and B are adjusted iteratively to achieve the target power level $C_0$ to within a specifiable tolerance. In other words, the output power C can be made close to the target power level $C_0$ such that the difference between them is within a specifiable tolerance. In particular, this can be achieved by making a coarse adjustment of A and a fine adjustment of B, in some embodiments.

The power meter 36 and signal routing 34 forms monitoring circuitry configured to measure power coupled from the operational path as an indication of the operational path output power C. This measurement may be communicated to the controller 31. The controller 31 may compare the indication to the target power level $C_0$ and based on the comparison, compute the attenuation setting A and adjust the attenuator/VGA amplifier 20, 21 to achieve the computed attenuation setting.

In some embodiments, the controller 31 is further configured to set an output power B of the channel emulator to a predetermined value. The predetermined value may, in some embodiments, be an upper output power limit of the channel emulator. In some embodiments, the predetermined value may be based on a maximum operating range of the power amplifier. In some embodiments, the predetermined value may be based on $P_{max}$. In some embodiments, the attenuation setting A is calculated to reduce a range over which the channel emulator output power B is adjusted to achieve the target output power level $C_0$. In some embodiments, the operational path includes a second coupler having an input coupled to an output of the channel emulator and having a first output coupled to the one of the amplifier/attenuator combination and the VGA, and having a second output coupled to a second monitoring path. In some embodiments, the second output to the indication of the output power C to determine a gain of the operational path.

Figure 12:
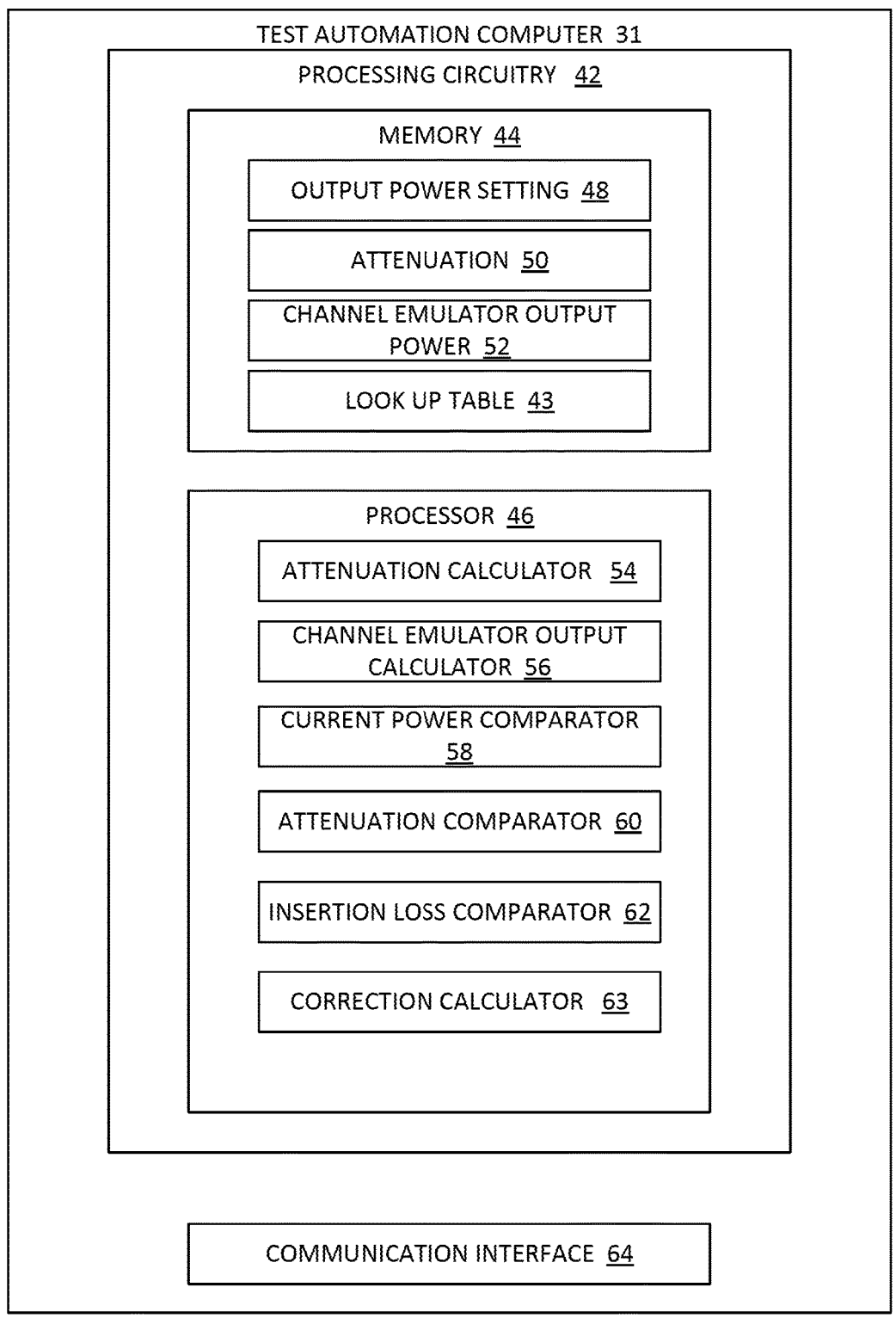
FIG. 12 is a block diagram of a test automation computer 31 constructed in accordance with principles set forth herein for controlling an output power of an operational path of a electromagnetic test apparatus.

FIG. 12 is a block diagram of a test automation computer 31 constructed in accordance with principles set forth herein for controlling an output power of an operational path of a electromagnetic test apparatus. The test automation computer 31 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuits).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store the target output power setting C, 48, the attenuation setting A, 50, and the channel emulator output power B, 52. These parameters are related according to the following equation.

$$C=B-A'+K$$

where B is less than the maximum power $P_{Max}$, A' is the attenuation setting A plus the insertion loss and/or any residual error in the value of the attenuator, and K is the remaining correction for the gains and losses of amplifiers, cables, antennas, range length, etc. Note that for a power level in the test volume, K is likely to be negative (more path loss than amplifier gain). A may preferably be chosen such that B is the highest possible value less than $P_{Max}$.

In some embodiments, the processor 46 includes a correction calculator 63 configured to determine an actual attenuation for the calculated attenuation from the attenuation calculator 54. The actual attenuation may include residual error (which may include cable losses, etc.) and possibly, attenuator insertion loss. The actual attenuation may be obtained from a look up table 43 that correlates a selected attenuation or attenuation step to an actual attenuation corresponding to that selected attenuation or attenuation step.

Thus, the processor 46 is programmable to implement the following functional modules: attenuation calculator 54, channel emulator output calculator 56, current power comparator 58, attenuation comparator 60, insertion loss comparator 62, and a correction calculator 63. The attenuation calculator 54 is configured to calculate an attenuation setting A and may also be configured to calculate an attenuation step, S, for incrementing the attenuation setting A. The channel emulator output calculator 56 is configured to calculate a channel emulator output power. The current power comparator 58 is configured to compare a target power level X to a current power setting. The attenuation comparator 60 is configured to compare the calculated attenuator setting A to a current attenuation setting. The insertion loss comparator 62 is configured to compare an insertion loss to the calculated attenuation A. The correction calculator 63 is configured to determine an actual attenuation, A', for the calculated attenuation from the attenuation calculator 54.

A communication interface 64 is configured to interface with the channel emulators 18 to set output powers of the channel emulators 18 and to interface with attenuators 21 to set the attenuations of the attenuators 21. Also, when the attenuators 21 are implemented as integral parts of the amplifiers 20, the communication interface 64 is configured to interface with the amplifiers 20.

Figure 13:
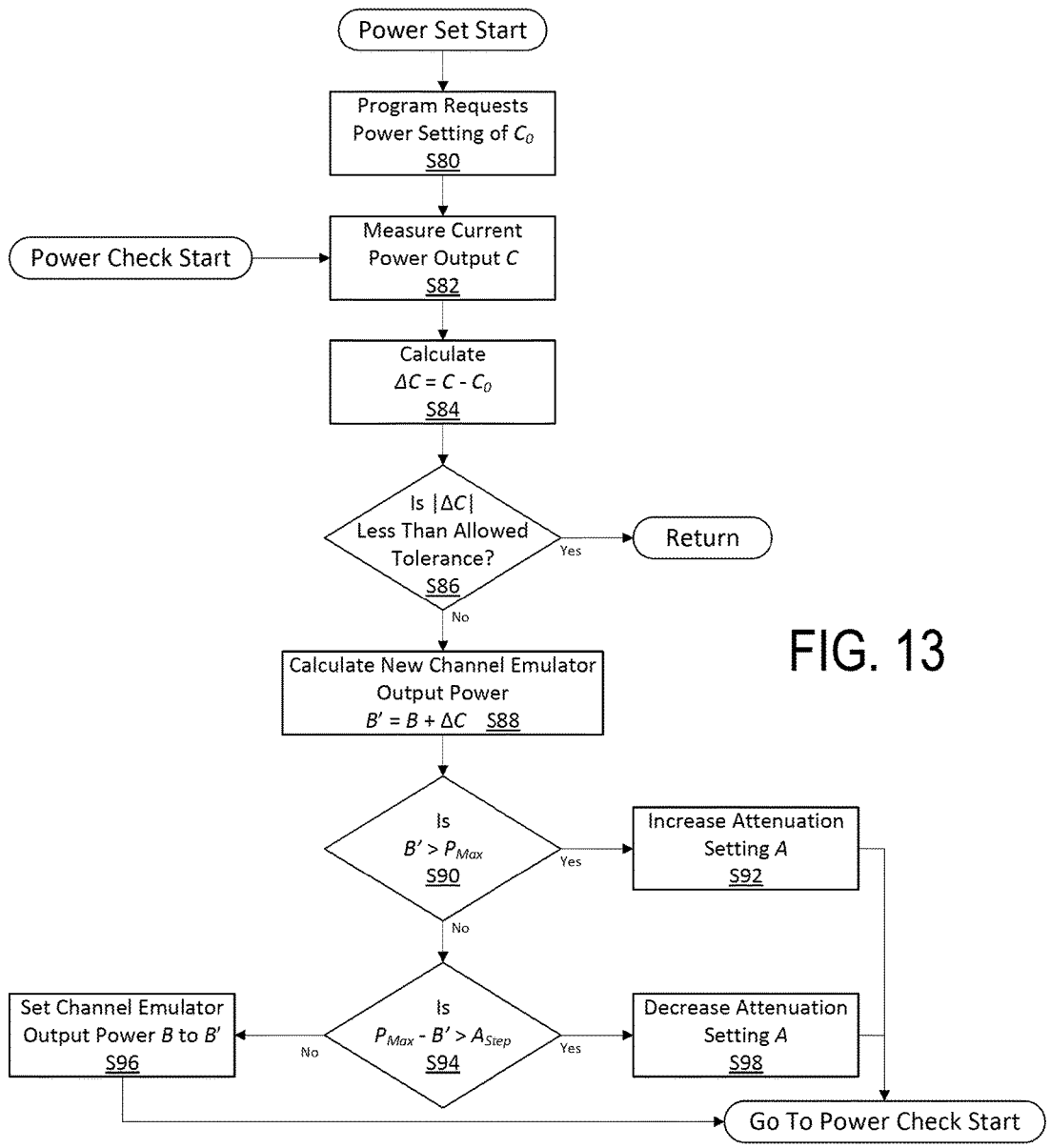
FIG. 13 is flowchart of an exemplary process for iteratively adjusting an attenuation setting and a channel emulator output to achieve a target power level.

FIG. 13 is a flowchart of an exemplary process for selectively achieving a desired target power level $C_0$. The process begins when a program requests a power setting of $C_0$ (block S80). The process includes measuring a current power output C. (block S82). The process includes calculating $\Delta C=C-C_0$ (block S84). If the magnitude of $\Delta C$ is less than an allowed tolerance, (block S86) the process of FIG. 13 ends. Otherwise, a new channel emulator output power B'=B+ΔC (block S88). If B' is greater than a predetermined maximum channel emulator output power $P_{max}$, (block S90) then the attenuation setting A is increased (block S92). Otherwise, if $P_{max}$-B' is greater than an attenuation step $A_{step}$, (block S94) the attenuation setting is decreased (block S98). Otherwise the channel emulator output power B is set to B' (block S96). The iterative process of FIG. 13 then continues at block 82. Note that it should be obvious to one skilled in the art that residual errors in the settings of A and B could result in an oscillation in the measured value C that could result in an infinite loop. An additional check (not pictured) may be performed to prevent retrying invalid combinations and A and B and instead exit the loop with a value of B less than $P_{Max}$-$A_{Step}$ by overriding step S94. It should also be apparent that while for clarity the flow chart represents the steps of setting a new value of A and B separately, with power checks in between, the expected values for both A and B may both be changed prior to re-measuring the resulting C value and repeating the iteration.

Figure 14:
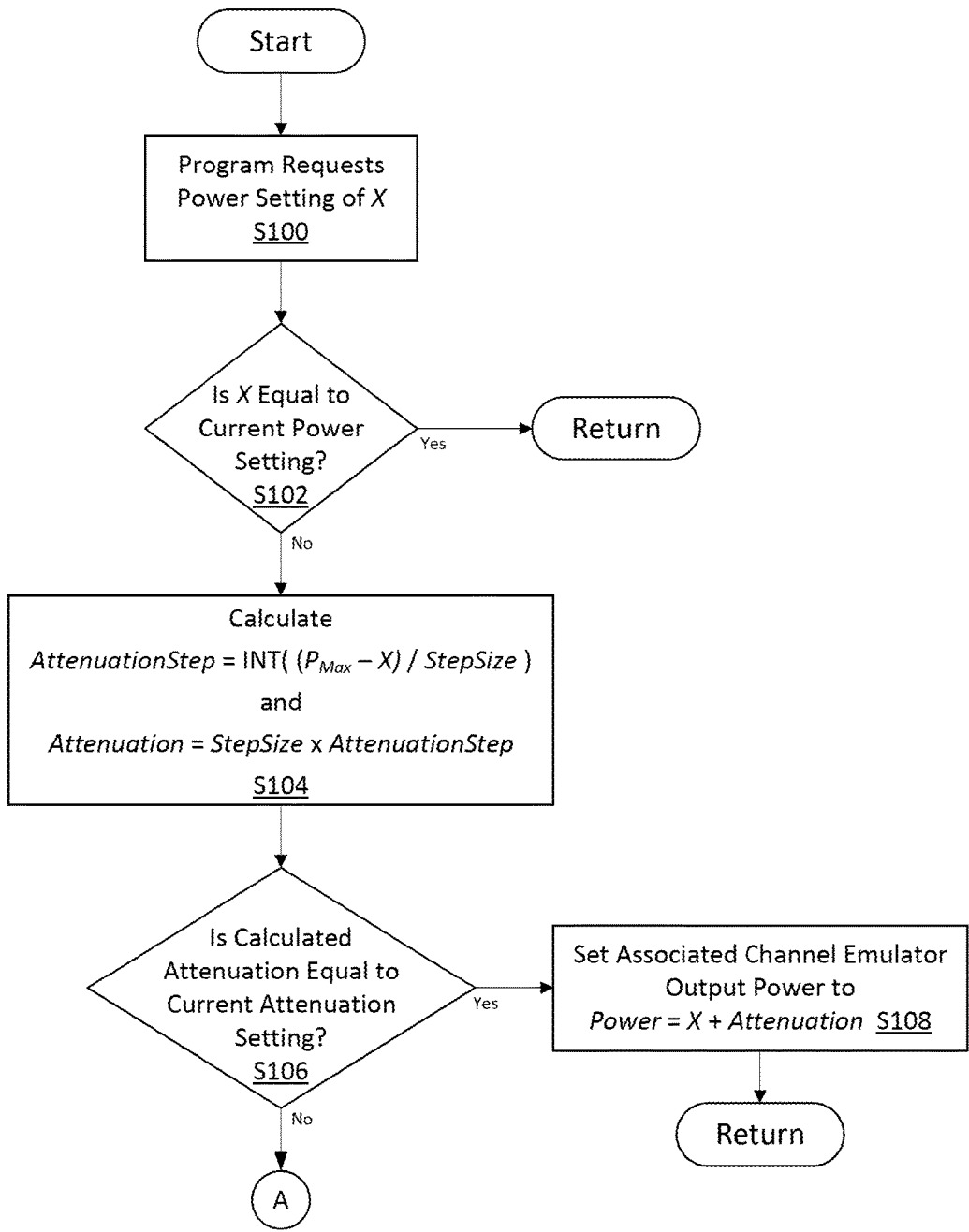
FIGS. 14 and 15 are flowcharts of an exemplary process for selectively setting power of an output of a channel emulator and an attenuator according to principles set forth herein.
Figure 15:
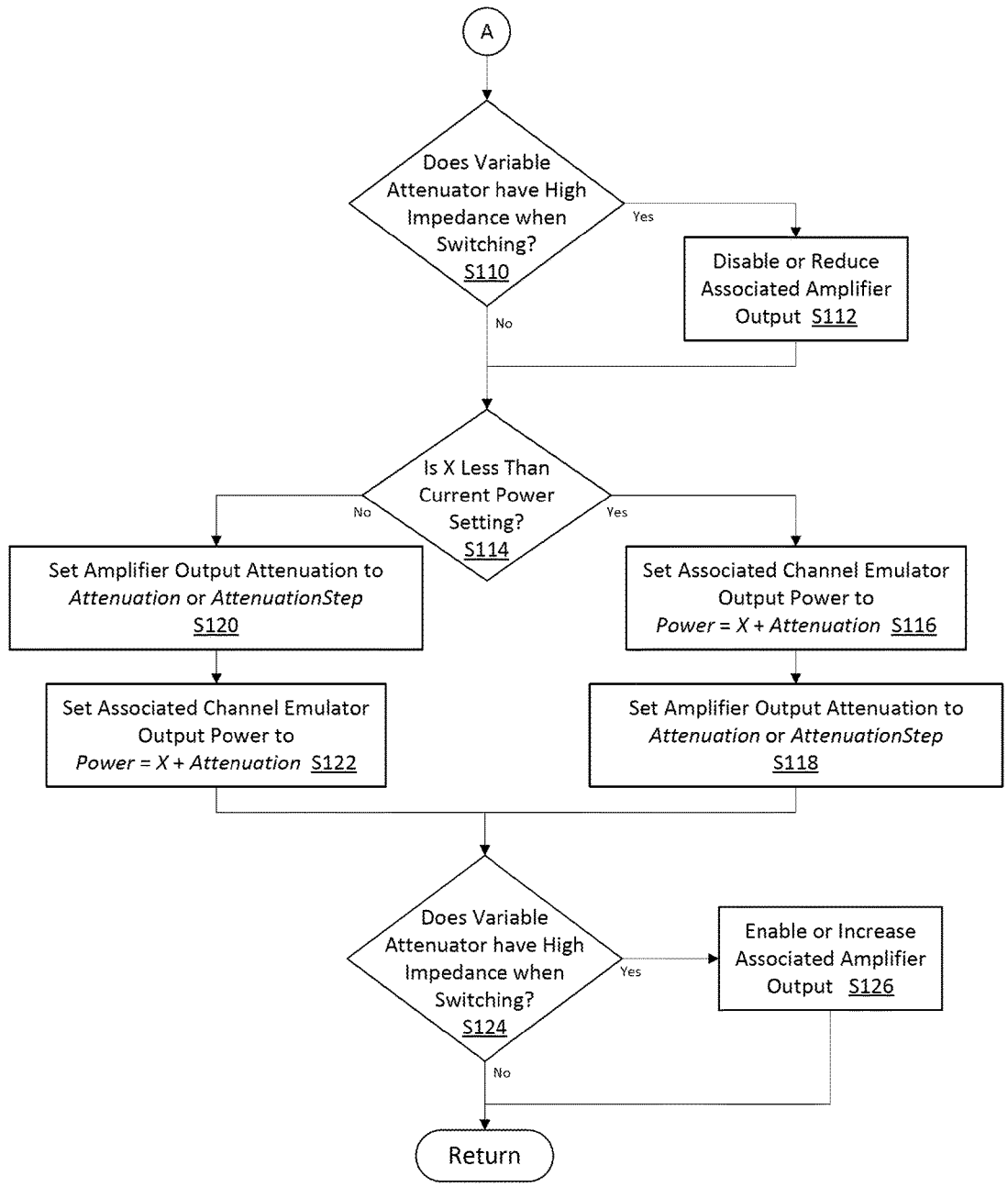

FIGS. 14 and 15 are flowcharts of an exemplary process for selectively setting power of an output of a channel emulator 18 and an attenuator 21 according to principles set forth herein. Starting at the top of FIG. 14, the process includes receiving a requested power setting, X (block S100). The power setting X is compared, via the current power comparator 58, to the current power setting of that channel of the channel emulator 18 (block S102). If X is equal to the current power setting the process returns. Otherwise, an attenuation step and attenuation are calculated, via the attenuation calculator 54, (block S104), according to:

AttenuationStep=INT(($P_{Max}$-X)/StepSize)

and

Attenuation=StepSize×AttenuationStep

Next, the calculated attenuation or attenuation step setting is compared, via the attenuation comparator 60, to the current attenuation/step setting (block S106). If the calculated attenuation is equal to the current attenuation setting, then the output power of an output of the channel emulator 18 is set to X plus the calculated or current attenuation (block S108). Otherwise, the process proceeds to block S110 of FIG. 15. If the variable attenuator 21 has a high impedance when switching, (block S110), the output of the amplifier 20 preceding the attenuator 21 is disabled or reduced (block S112). This may be done as described above. For example, the amplifier 20 output may be disabled by a number of different means, including powering off the amplifier module externally, using an internal disable function that powers down or disconnects one or more internal gain stages, and/or disabling the input signal from the channel emulator output. In the alternative to disabling the output power of the amplifier, the amplifier output can be reduced to a level that will prevent damage into a high impedance or open circuit, such as, by reducing the output of the channel emulator that is input to the amplifier.

The decision in block S114 and the subsequent steps may be used to control the order of setting of the channel emulator output power to keep the power from falling below the target level while switching. This may be desirable, for example, to prevent the loss of wireless communication during the adjustment. If the requested power setting X is less than the current power setting (block S114), then the output power of the output of the channel emulator 18 may be set to X plus the calculated attenuation via the channel emulator output calculator 56 (block S116). Subsequently, the amplifier output attenuation is set to the calculated attenuation or the attenuation step, as applicable (block S118). In particular, if the attenuator is set by step number, then the step number is used to set the attenuation. If the attenuator is set by attenuation value, then the attenuation value is specified.

If the requested power setting, X, is greater than the current power setting (block S114) then the amplifier output attenuation is set to the calculated attenuation or the attenuation step (block S120). Subsequently, the output power of the associated channel emulator output is set to X plus the calculated attenuation (block S122). From block S118 or S122, the process continues to block S124 where, if the variable attenuator has a high impedance when switching, the associated amplifier output is enabled or increased (block S126). The process then ends. Note that this entire algorithm may be performed in series or in parallel for the channels, (e.g., the same attenuation setting for all outputs for a net power control of the entire system.) However, the series approach offers several distinct advantages, including the ability to compensate for the relative power variation at each output (due to the cluster arrangement of the chosen model) in the output attenuators rather than at the channel emulator output, thereby improving the SNR of all outputs to the maximum possible. The sequential enabling and disabling of the outputs/amplifiers one at a time also ensure that the remaining outputs are still generating signals at the DUT, reducing the likelihood of lost communication connections and dropped calls.

Figure 16:
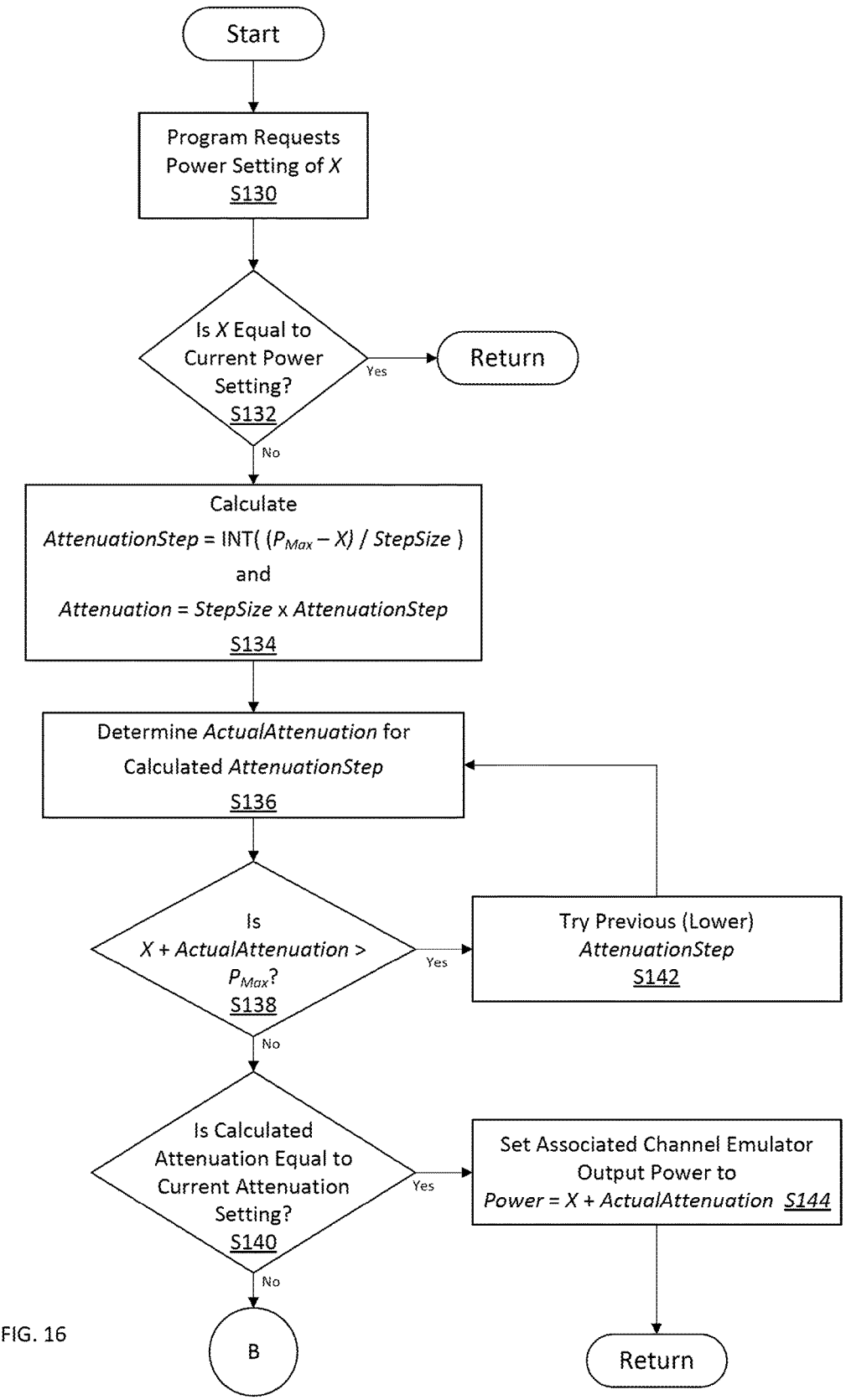
FIGS. 16, 17 and 18 are flowcharts of an exemplary process for selectively setting power of an output of a channel emulator and an attenuator with error correction according to principles set forth herein.
Figure 17:
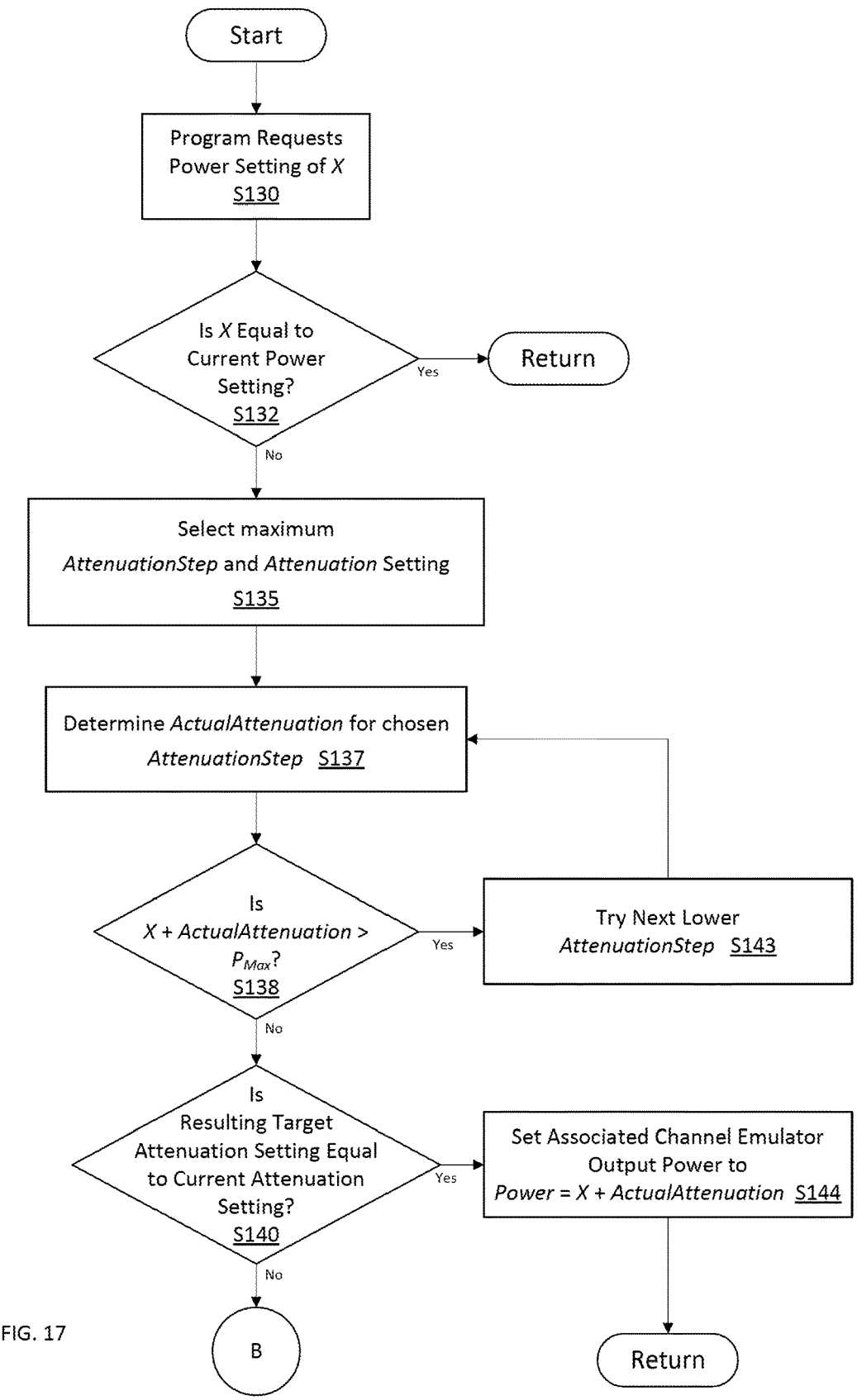
Figure 18:
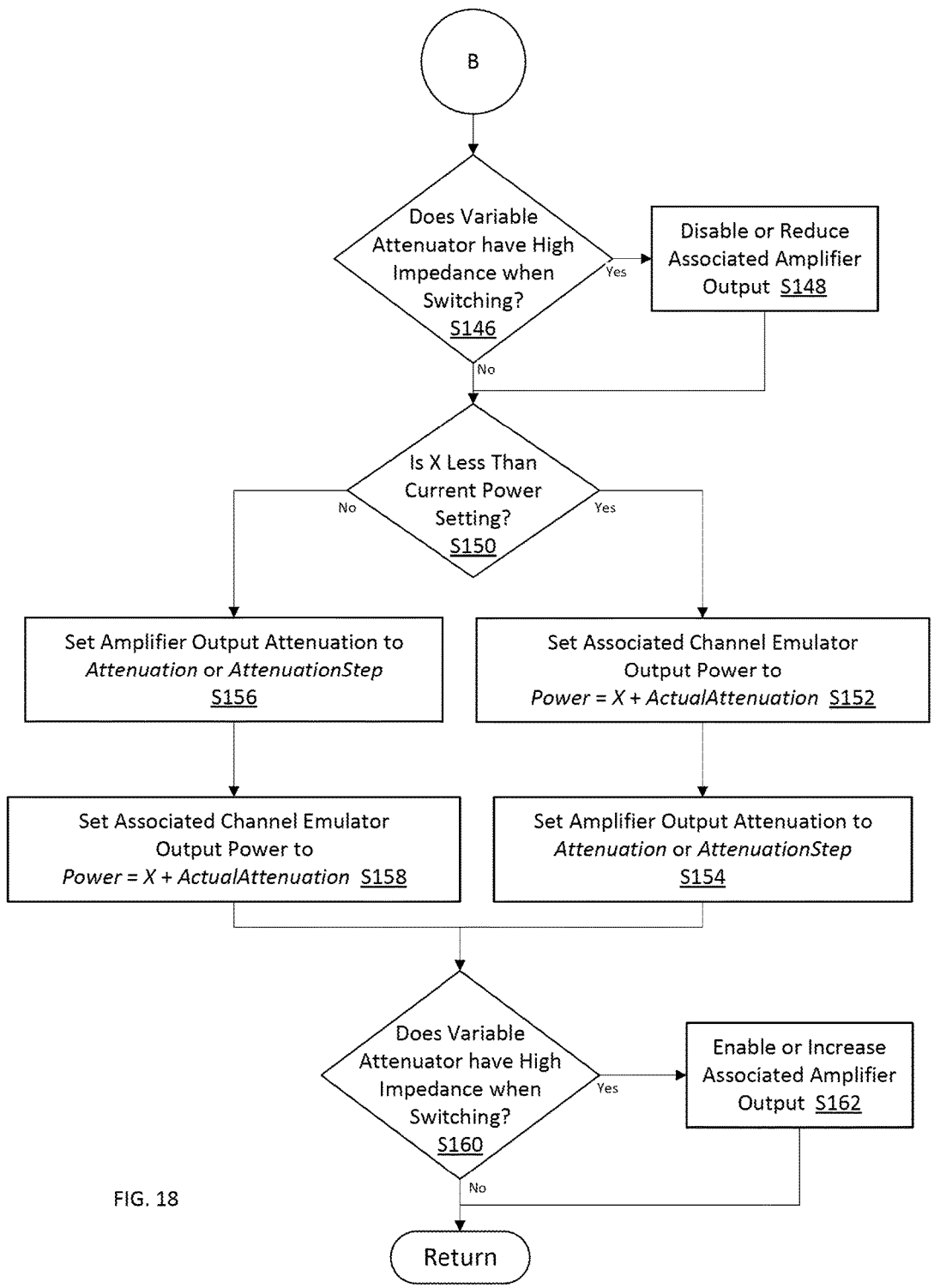

FIGS. 16, 17 and 18 are flowcharts of an exemplary process for selectively setting power of an output of a channel emulator 18 and an attenuator 21 with error correction according to principles set forth herein. Starting at the top of FIG. 16, the process includes receiving a requested power setting, X (block S130). The power setting X is compared, via the current power comparator 58, to the current power setting (block S132). If X is equal to the current power setting the process returns. Otherwise, an attenuation step and attenuation are calculated via the attenuation calculator 54 (block S134) according to:

AttenuationStep=INT(($P_{max}$-X)/StepSize)

and

Attenuation=StepSize×AttenuationStep where $P_{max}$ is the maximum output power of the channel emulator output.

The process includes determining an actual attenuation for the calculated attenuation step (block S136). The actual attenuation may include residual error (which may include cable losses, etc.) and possibly, attenuator insertion loss. The actual attenuation may be obtained from a look up table that correlates a selected attenuation or attenuation step to an actual attenuation corresponding to that selected attenuation or attenuation step. Once the actual attenuation is determined, a comparison is made to determine if the requested power setting X plus the actual attenuation is greater than the maximum channel emulator output power $P_{Max}$ (block S138). If so, a previous (lower) attenuation step is used (block S142) to determine the actual attenuation (block S136). If not, the process includes determining if the calculated attenuation is equal to the current attenuation setting (block S140). If so then the associated channel emulator output power is set to X plus the actual attenuation (block S144) and the process returns. Otherwise, the process continues to block S130 reproduced in FIG. 17.

In FIG. 17, in block S130, the program requests a power setting X. If X is equal to the current power setting, the process returns. Otherwise, a maximum attenuation step and attenuation setting are selected (block S135). Then an actual attenuation is chosen for the selected attenuation step (block S137). A determination is made whether the requested power setting plus actual attenuation exceeds the maximum output power, $P_{Max}$, of the channel emulator (block S138). If so, a next lower attenuation step is chosen (block 5143) and a new actual attenuation value is obtained corresponding to the next lower attenuation step (block S137). If X plus the actual attenuation is not greater than $P_{Max}$ (block S138), then a determination is made whether the resulting target attenuation setting is equal to the current attenuation setting (block S140). If so, then the associated channel emulator output power is set to X plus the actual attenuation (block S144). Otherwise, the process continues to block S146 of FIG. 18.

If the variable attenuator 21 has a high impedance when switching, (block S146), the output of the amplifier 20 preceding the attenuator 21 is disabled or its output is otherwise reduced, (block S148) and the process continues.

If the requested power setting X is less than the current power setting (block S150), then the output power of the output of the channel emulator 18 is set to X plus the calculated attenuation plus the calculated error correction (block S152). Subsequently, the amplifier output attenuation is set to the calculated attenuation or the attenuation step (block S154).

If the requested power setting X is greater than the current power setting (block S150) then the amplifier output attenuation is set to the calculated attenuation or the attenuation step (block S156). Subsequently, the output power of the associated channel emulator output is set to X plus the calculated attenuation plus the calculated error correction (block S158). From block S154 or S158, the process continues to block S160 where, if the variable attenuator has a high impedance when switching, the associated amplifier output is enabled or increased (block S158). The process then returns.

Figure 19:
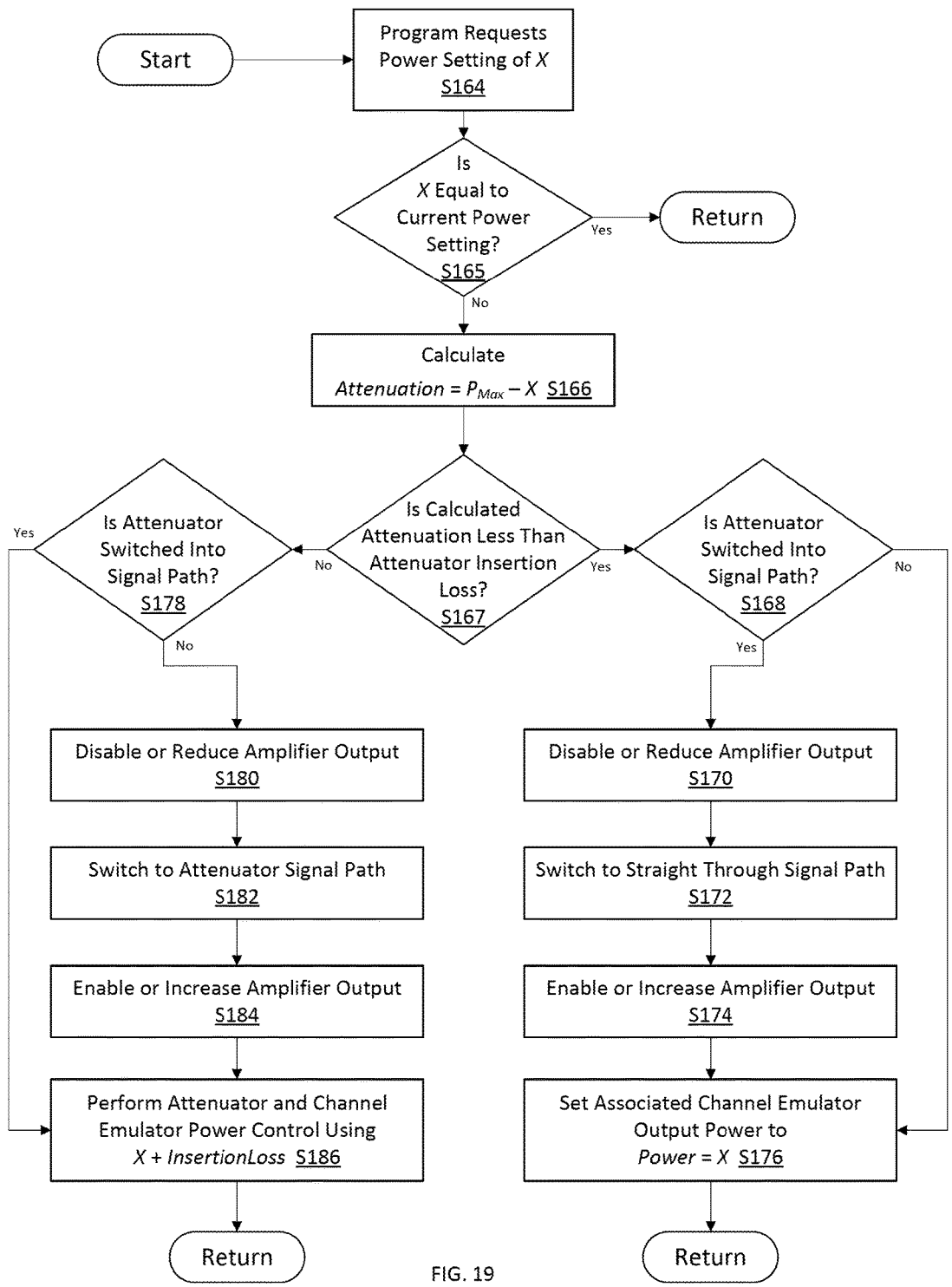
FIG. 19 is a flowchart of an exemplary process for selectively setting power of an output of a channel emulator and an attenuator, accounting for insertion loss of the attenuator according to principles set forth herein.

FIG. 19 is a flowchart of an exemplary process for selectively setting power of an output of a channel emulator 18 and an attenuator 21, accounting for insertion loss of the attenuator according to principles set forth herein. The process includes receiving a requested power setting, X (block S164). The power setting X is compared to the current power setting via the current power comparator 60 (block S165). If X is equal to the current power setting, the process returns. Otherwise, an attenuation is calculated (block S166) according to:

Attenuation=$P_{Max}$-X where $P_{Max}$ is the maximum power output of the channel emulator output.

A comparison is between the calculated attenuation and the attenuator insertion loss via the insertion loss comparator 62 (block S167). If the calculated attenuation is less than the attenuator insertion loss, then the process continues to block S168. At block S168, a determination is made whether the attenuator is switched into the signal path. If so, the process continues to block S170, and if not, the process continues at block S176. At block S170, the amplifier output is disabled or reduced as described above, by, for example, reducing the output power of the emulator output that is input to the amplifier. A switch in the path of the attenuator 21 is set to a straight through signal path, bypassing the attenuator 21 (block 172). The amplifier 20 output is enabled or increased (block S174). Then, the output power of the associated channel emulator output is set to X (block S176) and the process ends.

Returning to block S166, if the calculated attenuation is not less than the attenuator insertion loss, the process continues at block S178 where it is determined whether the attenuator is switched into the signal path. If so, the process continues at block S186. Otherwise, the amplifier output is disabled or reduced (block S180), the switch selects the attenuator path (block S182) and the amplifier 20 output is enabled or increased (block S184). Then the attenuator 21 and channel emulator 18 power control is set using X, substituting X plus the insertion loss for X (block S186).

In some embodiments, the processes of the flowcharts described herein may be implemented by software modules executed by the processor 46. In some embodiments, the enabling of the amplifier (S174/S184) may be delayed until the final steps of adjusting the attenuator (S176/S186).

Figure 20:
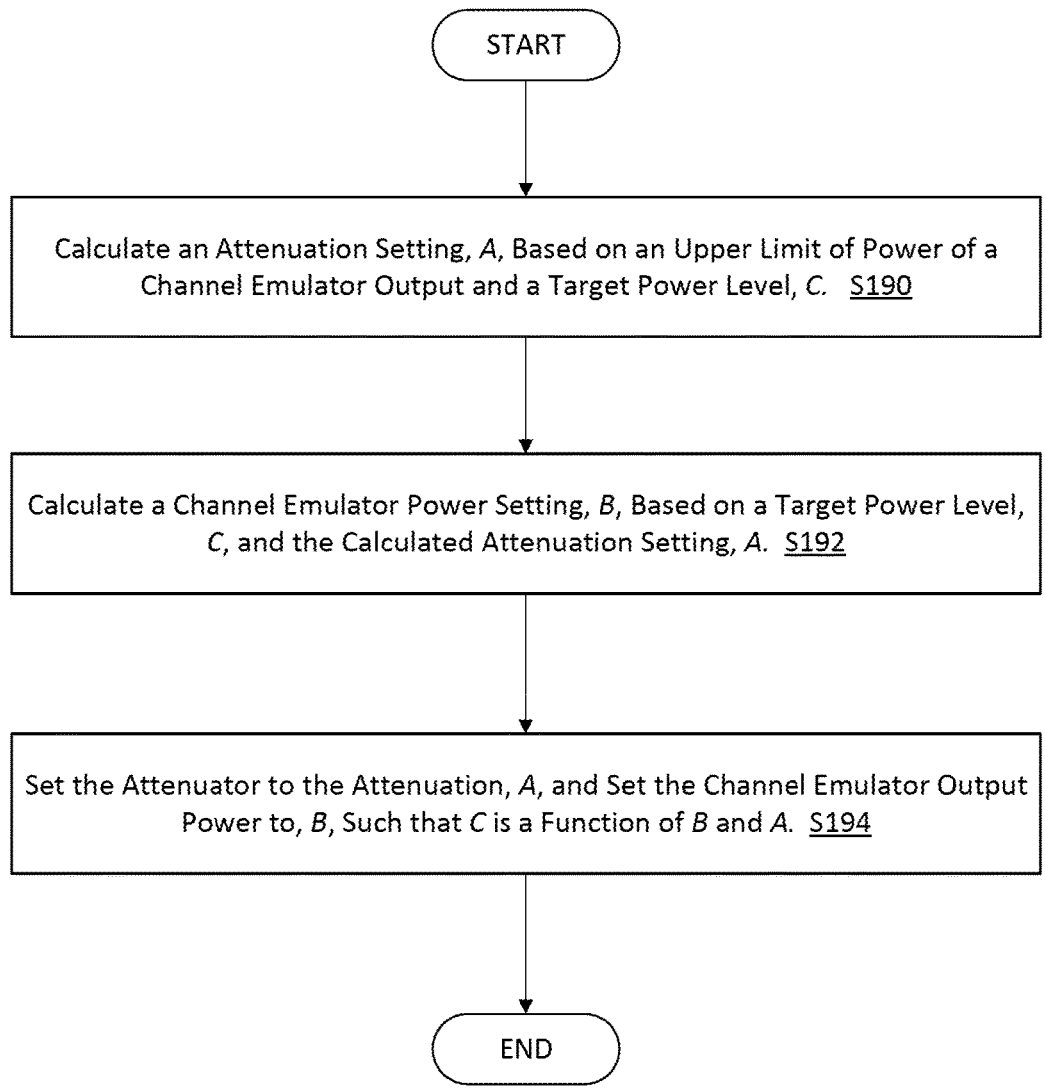
FIG. 20 is a flowchart of an exemplary process for implementing power control in an electromagnetic test system.

FIG. 20 is a flowchart of an exemplary process for implementing power control in an electromagnetic test system. The process includes calculating, via the attenuation calculator 54, an attenuation setting A based on an upper limit of power of a channel emulator output and the target power level C (block S190). The process also includes calculating, via the channel emulator output calculator 56, a channel emulator power setting B based on a target power level C and the calculated attenuation setting A (block S192). The process further includes setting the attenuator to the attenuation A and setting the channel emulator output power to B, such that C is a function of B and A (block S194).

FIG. 21 is a flowchart of another exemplary process for implementing power control in an electromagnetic test system. The process includes measuring power coupled to the monitoring path to produce an indication of an output power C of the operational path (S200). The process also includes comparing the indication of the output power C to a target power level $C_0$ (block S202). The process further includes iteratively adjusting an attenuator setting A to achieve the target power level $C_0$ (block S204). Note that in some embodiments, both A and B can be adjusted as discussed above with reference to FIG. 13. In some embodiments, adjustment of A may be a coarse adjustment and adjustment of B may be a fine adjustment to achieve the target power level $C_0$ to within a specifiable tolerance. In some embodiments, adjustment to achieve the target power level to within a specifiable tolerance may be by adjustment of A alone.

In some embodiments, the process further includes setting an output power B of the channel emulator to a predetermined value. The predetermined value may, in some embodiments, be an upper output power limit of the channel emulator. In some embodiments, the predetermined value may be based on a maximum operating range of the power amplifier. In some embodiments, the predetermined value may be based on $P_{max}$. In some embodiments, the attenuation setting A is calculated to reduce a range over which the channel emulator output power B is adjusted to achieve the target output power level $C_0$. In some embodiments, the operational path includes a second coupler having an input coupled to an output of the channel emulator and having a first output coupled to the one of the amplifier/attenuator combination and the VGA, and having a second output coupled to a second monitoring path. In some embodiments, the process further includes comparing the second output to the indication of the output power C to determine a gain of the operational path.

Note that the methods described above for the uplink and the downlink can be combined to form a bidirectional system with directional couplers for coupling power amplifiers in both the uplink and the downlink to test devices such as power meters or spectrum analyzers.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An electromagnetic measurement system for testing a device in a test region, the system comprising:
   in an operational path extending between a port of a channel emulator and an antenna directed to the device:
      one of an amplifier/attenuator combination and a variable gain amplifier (VGA) in line with the operational path;
      a coupler in line with the operational path, the coupler configured to couple a portion of energy from the operational path to monitoring circuitry;
   monitoring circuitry configured to receive and measure power coupled to the monitoring circuitry by the coupler, the measured power being communicated to the controller as an indication of an output power C of the operational path; and
   a controller configured to:
      control the output power C of the operational path by setting one of the attenuator and the VGA to achieve an attenuation setting A; and
      set the channel emulator output to a value B, such that C is a function of A and B;
      compare C to a target power level $C_0$; and
      adjust at least one of A and B iteratively to achieve the target power level $C_0$ to within a specifiable tolerance.

2. The system of claim 1, wherein a coarse adjustment of A and a fine adjustment of B is made to achieve the target power level $C_0$ within the specifiable tolerance.

3. The system of claim 1, further comprising comparison circuitry configured to compare power measurements from a plurality of operational paths.

4. The system of claim 1, wherein the controller is configured to set the channel emulator output B to a predetermined value.

5. The system of claim 1, wherein the setting of the one of the attenuator and the VGA to achieve the attenuation value A is based on the indication of the output power C of the operational path received by the controller from the monitoring circuitry.

6. The system of claim 1, wherein a setting of the attenuation setting A is calculated to reduce a range over which the channel emulator output power B is adjusted to achieve the target power level $C_0$.

7. The system of claim 1, further comprising a second coupler in line with the operational path, the second coupler having an input coupled to an output of the channel emulator, having a first output coupled to an input of the power amplifier, and having a second output coupled to a second monitoring path.

8. A method for controlling an output of an operational path extending between a channel emulator and an antenna in an electromagnetic test system, the operational path including one of an amplifier/attenuator combination and a variable gain amplifier (VGA), a coupler and an antenna, the coupler configured to couple power to the antenna and to couple power to a monitoring path, the method comprising:
   measuring power coupled to the monitoring path to produce an indication of an output power C of the operational path;
   comparing the indication of the output power C to a target power level $C_0$;
   iteratively adjusting at least one of an attenuation setting A and a channel emulator output B to achieve the target power level $C_0$ to within a specifiable tolerance.

9. The method of claim 8, wherein a coarse adjustment of A and a fine adjustment of B is made to achieve the target power level $C_0$ within the specifiable tolerance.

10. The method of claim 8, further comprising setting an output power B of the channel emulator to a predetermined value.

11. The method of claim 8, wherein the attenuation setting A is calculated to reduce a range over which the channel emulator output power B is adjusted to achieve the target output power level $C_0$.

12. The method of claim 8, wherein the operational path includes a second coupler having an input coupled to an output of the channel emulator and having a first output coupled to the one of the amplifier/attenuator combination and the VGA, and having a second output coupled to a second monitoring path.

13. The method of claim 12, further comprising comparing the second output to the indication of the output power C to determine a gain of the operational path.

14. A system for simulating electromagnetic environments, comprising:
   a channel emulator having a plurality of outputs, each output associated with a different operational path, each operational path having:
      one of an amplifier/attenuator combination and a variable gain amplifier (VGA) coupled to an output of the channel emulator;
      a coupler configured to couple first power from an output of the one of the amplifier/attenuator combination and the VGA to an antenna and to couple second power from the output of the one of the amplifier/attenuator combination and the VGA to a first monitoring path; and
      an antenna in communication with a test region of the system; and
   a controller configured to:
      control an output power C of the operational path by setting one of the attenuator and the VGA to achieve an attenuation setting A; and
      set the channel emulator output to a value B, such that C is a function of A and B;
      compare C to a target power level $C_0$;
      adjust at least one of A and B iteratively to achieve the target power level $C_0$ to within a specifiable tolerance.

15. The system of claim 14, wherein a coarse adjustment of A and a fine adjustment of B is made to achieve the target power level $C_0$ within the specifiable tolerance.

16. The system of claim 14, further comprising a measurement device coupled to the first monitoring path, the measurement device providing a measurement of an output of the power amplifier in the operational path, the measurement providing an indication of the output power C.

17. The system of claim 16, wherein the setting of the one of the attenuator and the VGA to achieve the attenuation value A is based on the indication of the output power C of the operational path received by the controller from the monitoring circuitry.

18. The system of claim 14, further comprising comparison circuitry configured to compare power measurements from a plurality of operational paths.

19. The system of claim 14, wherein the controller is configured to set the channel emulator output B to a predetermined value.

20. The system of claim 14, wherein a setting of the attenuation setting A is calculated to reduce a range over which the channel emulator output power B is adjusted to achieve the target power level $C_0$.

* * * * *